US012683971B2

(12) United States Patent
Yoshioka

(10) Patent No.: US 12,683,971 B2
(45) Date of Patent: Jul. 14, 2026

(54) MONITORING APPARATUS AND CONTROL METHOD THEREOF

(71) Applicant: CANON KABUSHIKI KAISHA, Tokyo (JP)

(72) Inventor: Migaku Yoshioka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 111 days.

(21) Appl. No.: 18/509,753

(22) Filed: Nov. 15, 2023

(65) Prior Publication Data

US 2024/0171585 A1 May 23, 2024

(30) Foreign Application Priority Data

Nov. 21, 2022 (JP) ................................. 2022-185755

(51) Int. Cl.
*H04L 9/40* (2022.01)

(52) U.S. Cl.
CPC ........ *H04L 63/102* (2013.01); *H04L 63/0876* (2013.01); *H04L 63/20* (2013.01)

(58) Field of Classification Search
CPC ... H04L 63/102; H04L 63/0876; H04L 63/20; H04L 43/00; G06F 11/30
See application file for complete search history.

(56) References Cited

U.S. PATENT DOCUMENTS

2010/0235284 A1 9/2010 Moore
2011/0026942 A1 2/2011 Naito

2012/0054841 A1 3/2012 Schultz et al.
2012/0307277 A1* 12/2012 Kishida .............. H04N 1/00244
358/1.15
2016/0065430 A1 3/2016 Hirahara
2016/0218945 A1 7/2016 Hirahara
(Continued)

FOREIGN PATENT DOCUMENTS

JP 2017126191 A 7/2017

OTHER PUBLICATIONS

Kawana Katsumasa, JP 2018136876, Machine Translation, Aug. 30, 2018, pp. 1-38. (Year: 2018).*
(Continued)

*Primary Examiner* — Luu T Pham
*Assistant Examiner* — Canh Le
(74) *Attorney, Agent, or Firm* — ROSSI, KIMMS & McDOWELL LLP

(57) ABSTRACT

A monitoring apparatus obtains a device list from a device management server, determines a monitoring method for monitoring a device included in the device list, and executes first registration processing in order to register a first device that is monitored using a first monitoring method, to an authorization server, and executes second registration processing different from the first registration processing in order to register, to the authorization server, a second device that is monitored using a second monitoring method different from the first monitoring method. The first registration processing includes instructing the first device to use a designated proxy server, and instructing the first device to transmit, to the authorization server, a request to register the first device to the authorization server, after the first device has started to use the designated proxy server.

10 Claims, 16 Drawing Sheets

(56) References Cited

U.S. PATENT DOCUMENTS

| | | | |
|---|---|---|---|
| 2016/0277413 A1 | 9/2016 | Ajitomi et al. | |
| 2017/0041287 A1* | 2/2017 | Pak | H04L 12/18 |
| 2017/0264779 A1 | 9/2017 | Hirahara | |
| 2017/0337549 A1 | 11/2017 | Wong | |
| 2018/0157942 A1* | 6/2018 | Nagasaki | G06K 15/402 |
| 2020/0045204 A1 | 2/2020 | Niimoto et al. | |
| 2020/0336309 A1 | 10/2020 | Wang et al. | |
| 2021/0274053 A1 | 9/2021 | Yano | |
| 2021/0336950 A1 | 10/2021 | Miyamoto | |
| 2022/0058037 A1 | 2/2022 | Ye et al. | |
| 2022/0317947 A1* | 10/2022 | Shiraga | G06F 3/1224 |
| 2022/0353263 A1 | 11/2022 | Choyi et al. | |
| 2023/0291643 A1 | 9/2023 | Baba | |
| 2023/0328061 A1* | 10/2023 | Mori | H04L 63/0876 726/6 |

OTHER PUBLICATIONS

Martin Kontset et al., "Survey of the monitoring tools suitable for CC environment," 2020, pp. 330-335. (Year: 2020).*

Minoru Uehara et al., "A Real-time Retrieval System using Change Aware Distributed File System," 2004, pp. 1-8. (Year: 2004).*

Baba. Copending U.S. Appl. No. 18/509,602, filed Nov. 15, 2023 (a copy is not included because the cited application is not yet available to the public and the Examiner has ready access to the cited application).

Baba. Copending U.S. Appl. No. 18/509,789, filed Nov. 15, 2023 (a copy is not included because the cited application is not yet available to the public and the Examiner has ready access to the cited application).

Office Action issued in U.S. Appl. No. 18/509,602, mailed May 28, 2024.

Notice of Allowance issued in U.S. Appl. No. 18/509,602 mailed Oct. 15, 2024.

Office Action issued in U.S. Appl. No. 18/509,789 mailed on Jul. 29, 2025.

Office Action issued in U.S. Appl. No. 18/509,789 mailed on Dec. 30, 2025.

* cited by examiner

Figures 5, 6:
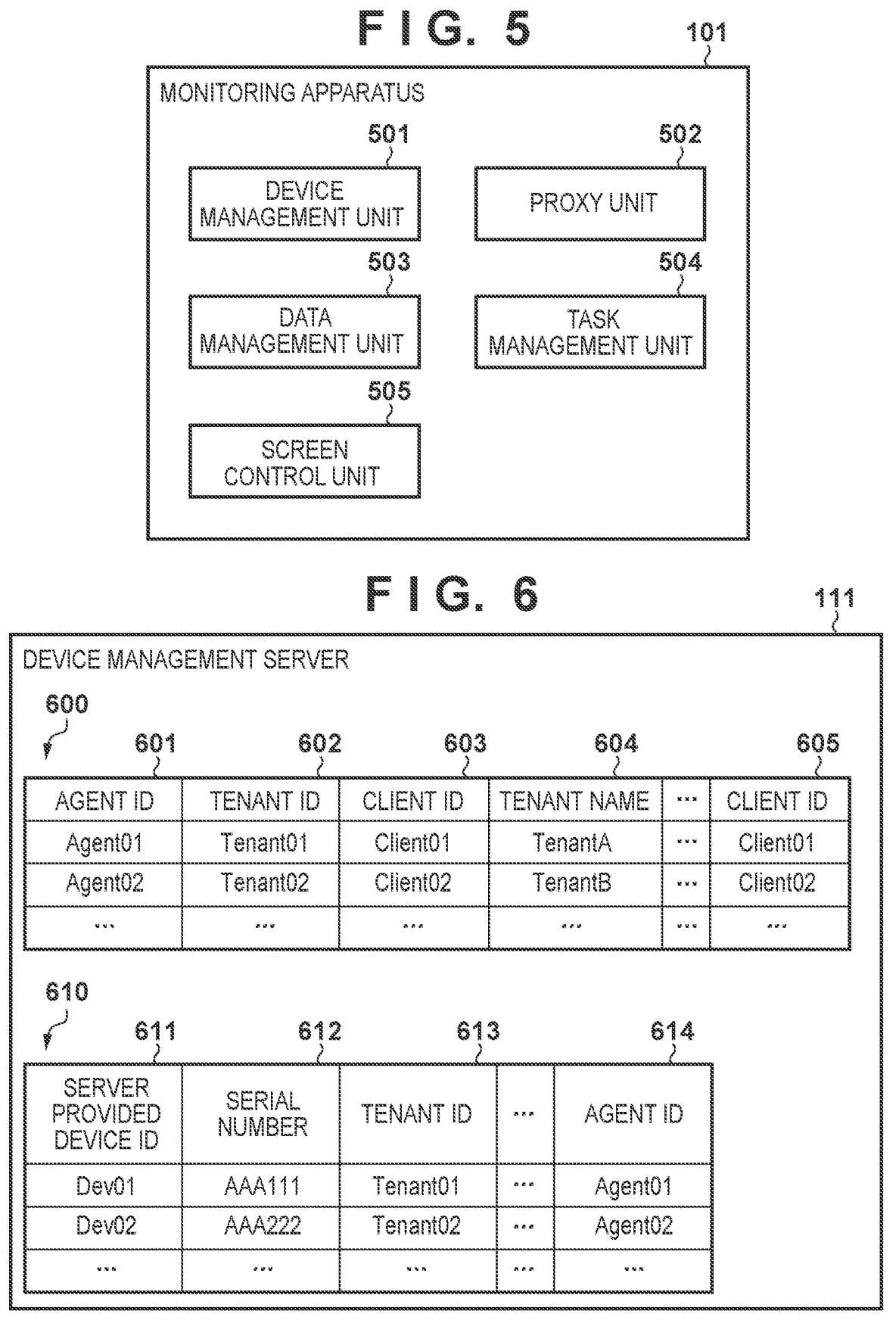

MONITORING APPARATUS

| 501 | 502 |
|-----|-----|
| DEVICE MANAGEMENT UNIT | PROXY UNIT |

| 503 | 504 |
|-----|-----|
| DATA MANAGEMENT UNIT | TASK MANAGEMENT UNIT |

505

SCREEN CONTROL UNIT

DEVICE MANAGEMENT SERVER

600

| 601 | 602 | 603 | 604 | | 605 |
|-----|-----|-----|-----|---|-----|
| AGENT ID | TENANT ID | CLIENT ID | TENANT NAME | ... | CLIENT ID |
| Agent01 | Tenant01 | Client01 | TenantA | ... | Client01 |
| Agent02 | Tenant02 | Client02 | TenantB | ... | Client02 |
| ... | ... | ... | ... | ... | ... |

610

| 611 | 612 | 613 | | 614 |
|-----|-----|-----|---|-----|
| SERVER PROVIDED DEVICE ID | SERIAL NUMBER | TENANT ID | ... | AGENT ID |
| Dev01 | AAA111 | Tenant01 | ... | Agent01 |
| Dev02 | AAA222 | Tenant02 | ... | Agent02 |
| ... | ... | ... | ... | ... |

F I G. 7

MONITORING APPARATUS — 101

700

| DEVICE ID | SERIAL NUMBER | IP ADDRESS | ... | MANAGEMENT STATE | REGISTRATION STATE | MONITORING METHOD | SERVER PROVIDED DEVICE ID |
|-----------|---------------|------------|-----|------------------|--------------------|--------------------|---------------------------|
| 701 | 702 | 703 | | 704 | 705 | 706 | 707 |
| 00000001 | AAA111 | 172.16.11.11 | ... | TARGET | REGISTERED | PROXY | Dev01 |
| 00000002 | AAA222 | 172.16.11.22 | ... | TARGET | NOT REGISTERED | POLLING | Dev02 |
| 00000003 | AAA333 | 172.16.11.33 | ... | NOT TARGETED | NOT REGISTERED | POLLING | Dev03 |
| ... | ... | ... | ... | ... | ... | ... | ... |

F I G. 8

112

AUTHORIZATION SERVER

800

| ACTIVATION CODE (801) | AGENT ID (802) | CUSTOMER ID (803) | EXPIRATION DATE (804) | ... |
|---|---|---|---|---|
| af80a89a03 | Agent01 | Customer01 | 2022/04/15 16:32:14 | ... |
| ... | ... | ... | ... | ... |

810

| ACTIVATION CODE (811) | SERIAL NUMBER (812) | DEVICE REGISTRATION KEY (813) | EXPIRATION DATE (814) | ... |
|---|---|---|---|---|
| ai30s0qiq0w | Dev01 | 48hoa89f8k | 2022/04/15 16:32:14 | ... |
| ... | ... | ... | ... | ... |

820

| DEVICE REGISTRATION KEY (821) | TENANT ID (822) | EXPIRATION DATE (823) | ... |
|---|---|---|---|
| 48hoa89f8k | Tenant01 | 2022/04/15 15:42:24 | ... |
| ... | ... | ... | ... |

830

| CLIENT ID (831) | SERIAL NUMBER (832) | TENANT ID (833) | ... |
|---|---|---|---|
| Dev01 | AAA111 | Tenant01 | ... |
| Dev02 | AAA222 | Tenant02 | ... |
| ... | ... | ... | ... |

840

| CLIENT ID (841) | CREDENTIAL (842) | ... |
|---|---|---|
| Dev01 | il8fs36gfw | ... |
| ... | ... | ... |

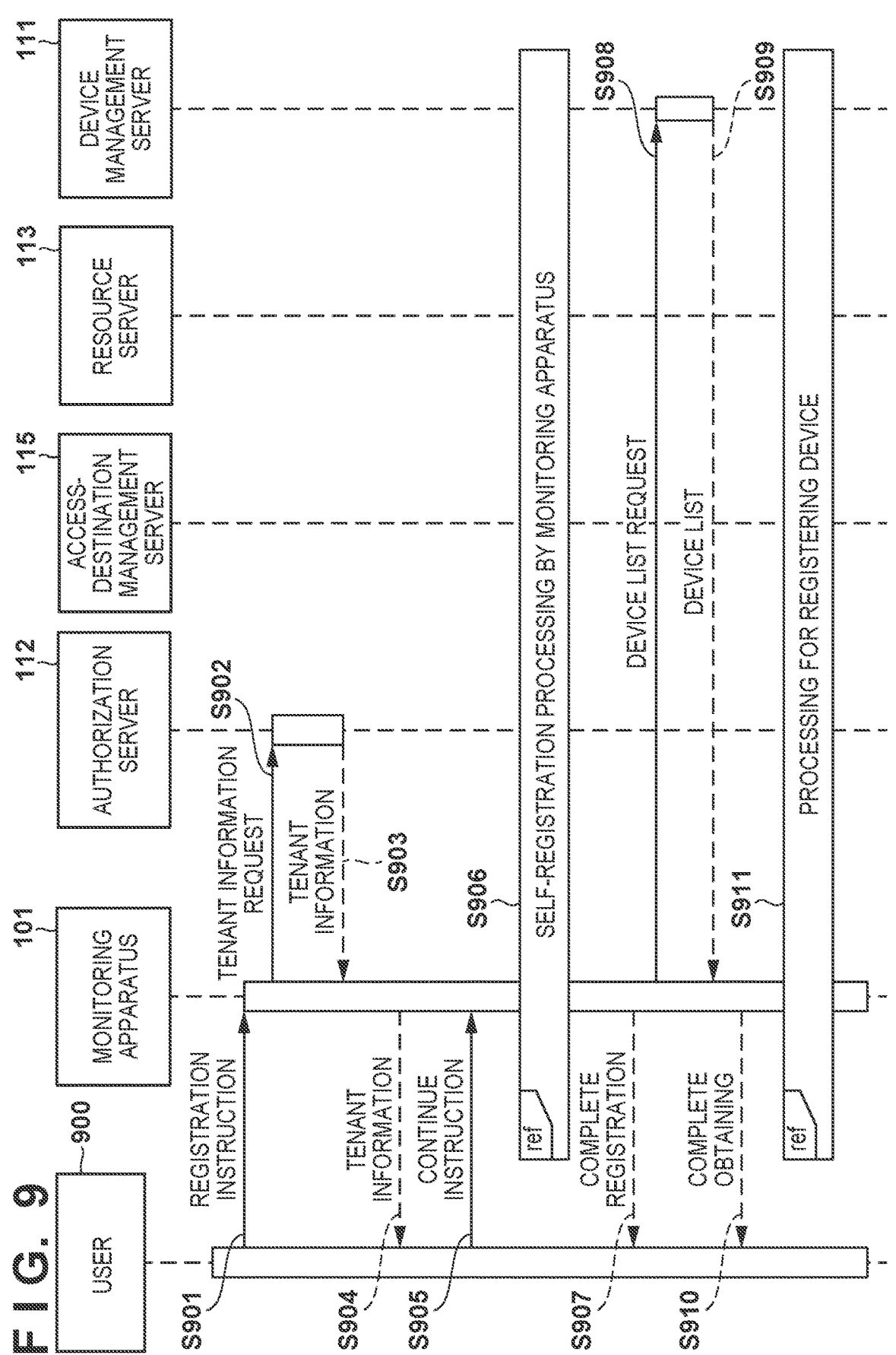
F I G. 9

F I G.   11
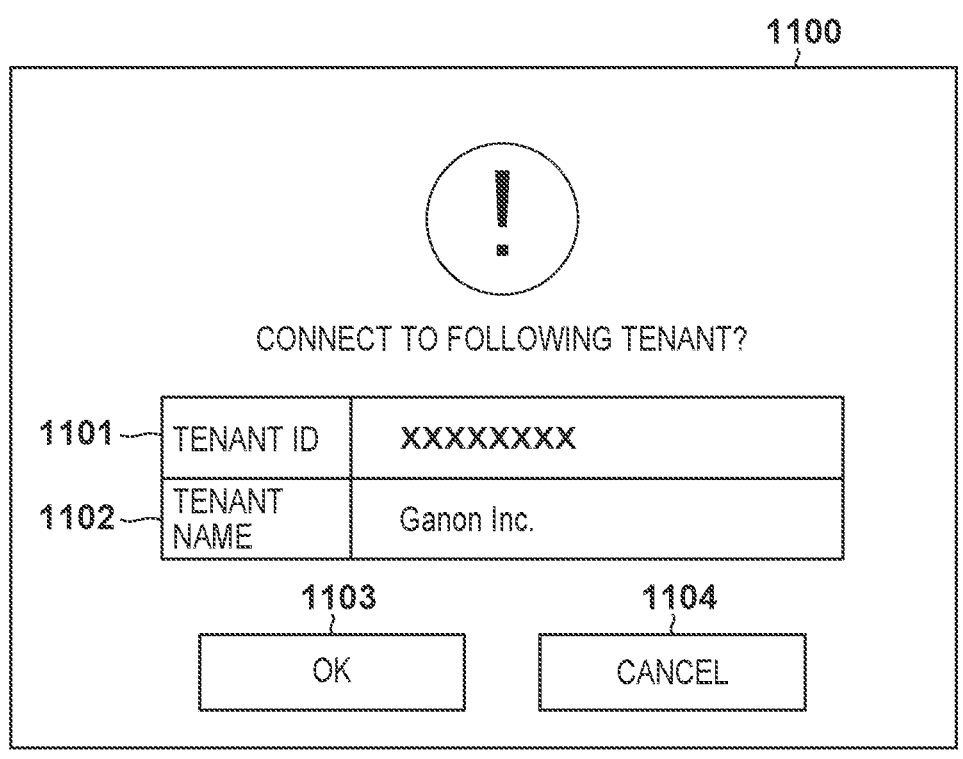

F I G. 12
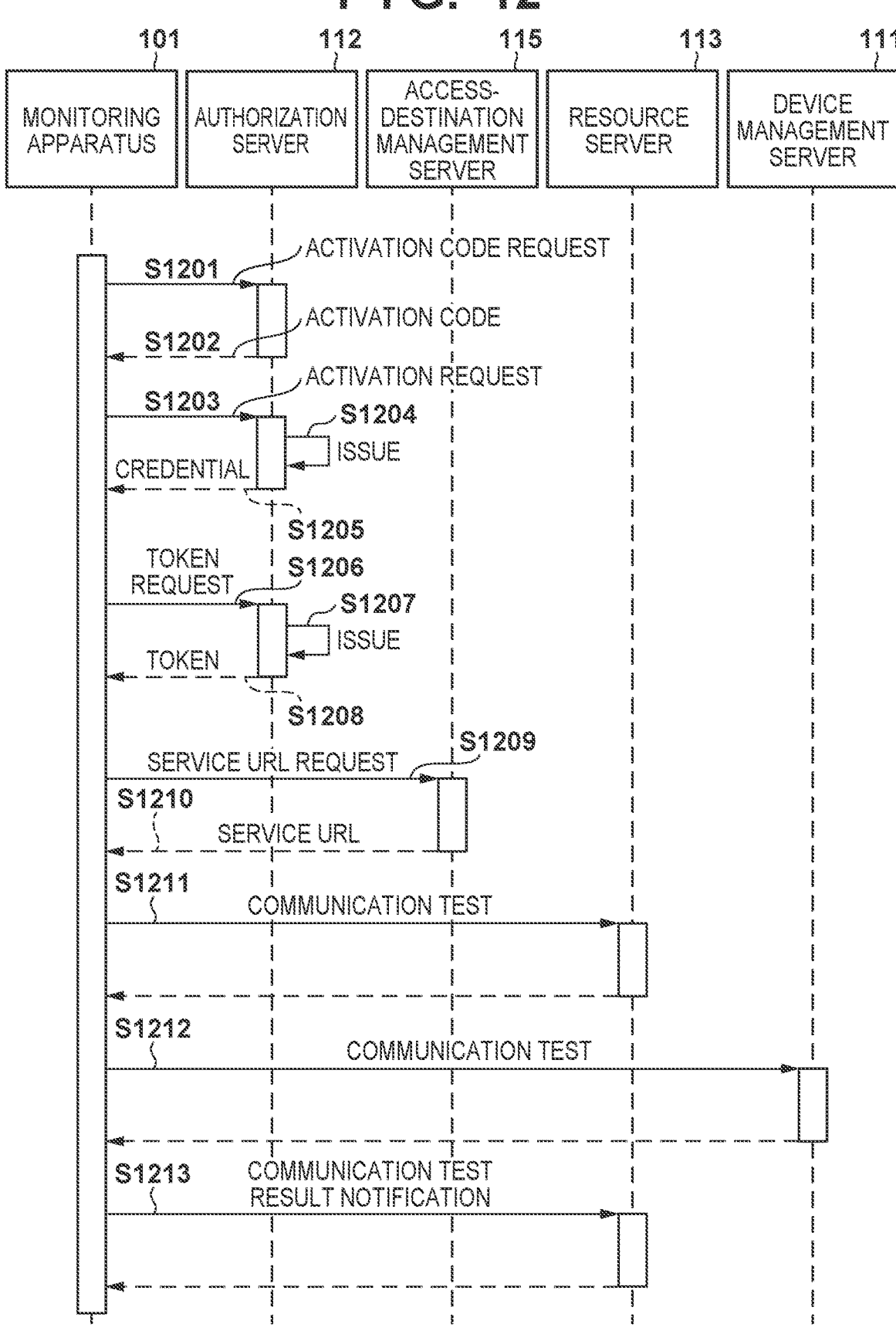

F I G. 14
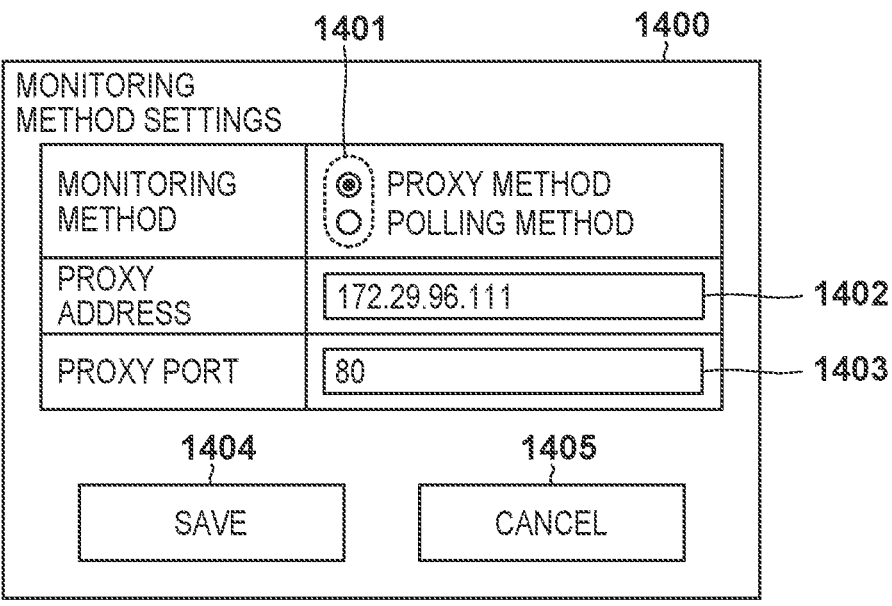

F I G. 15
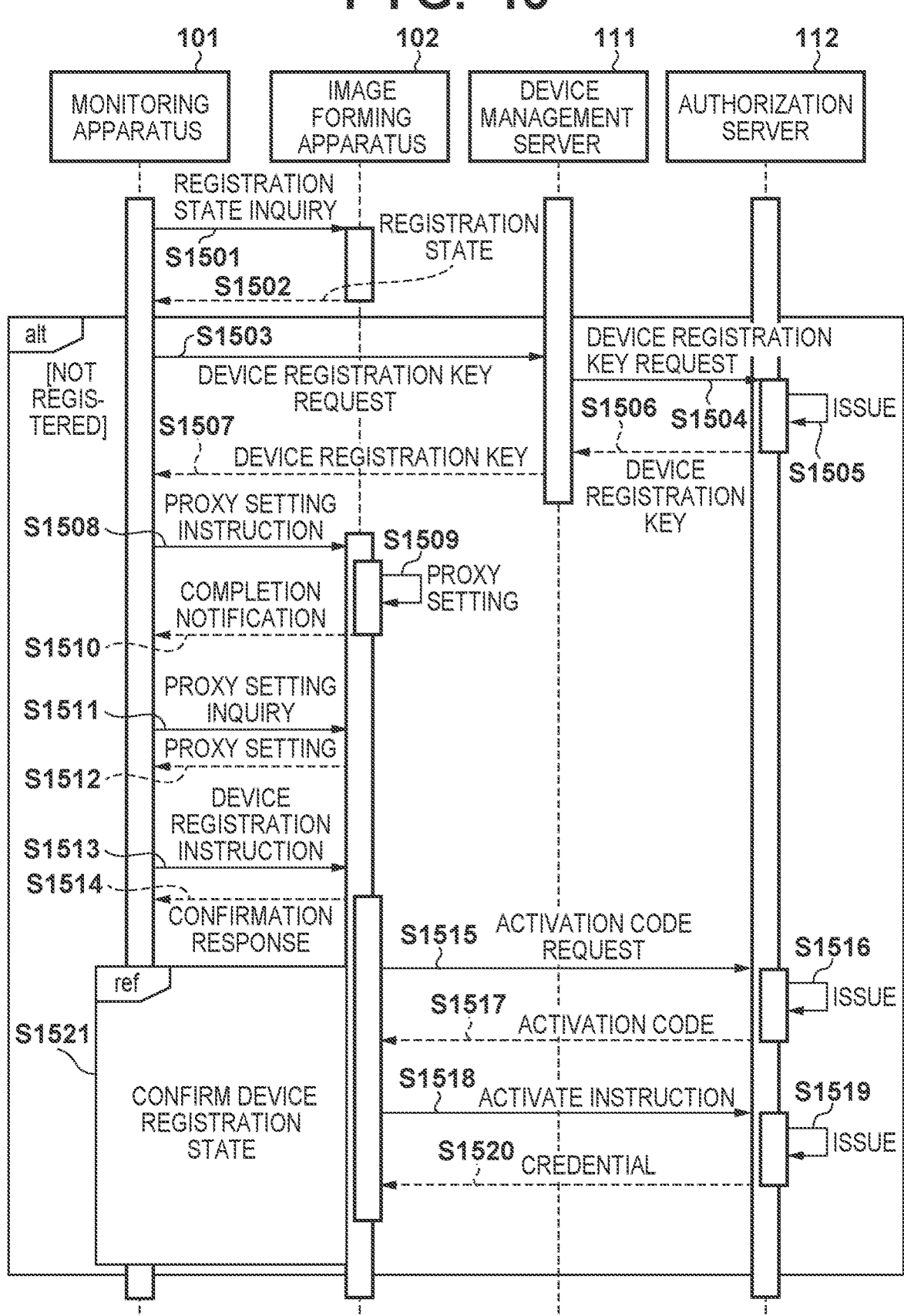

F I G. 16
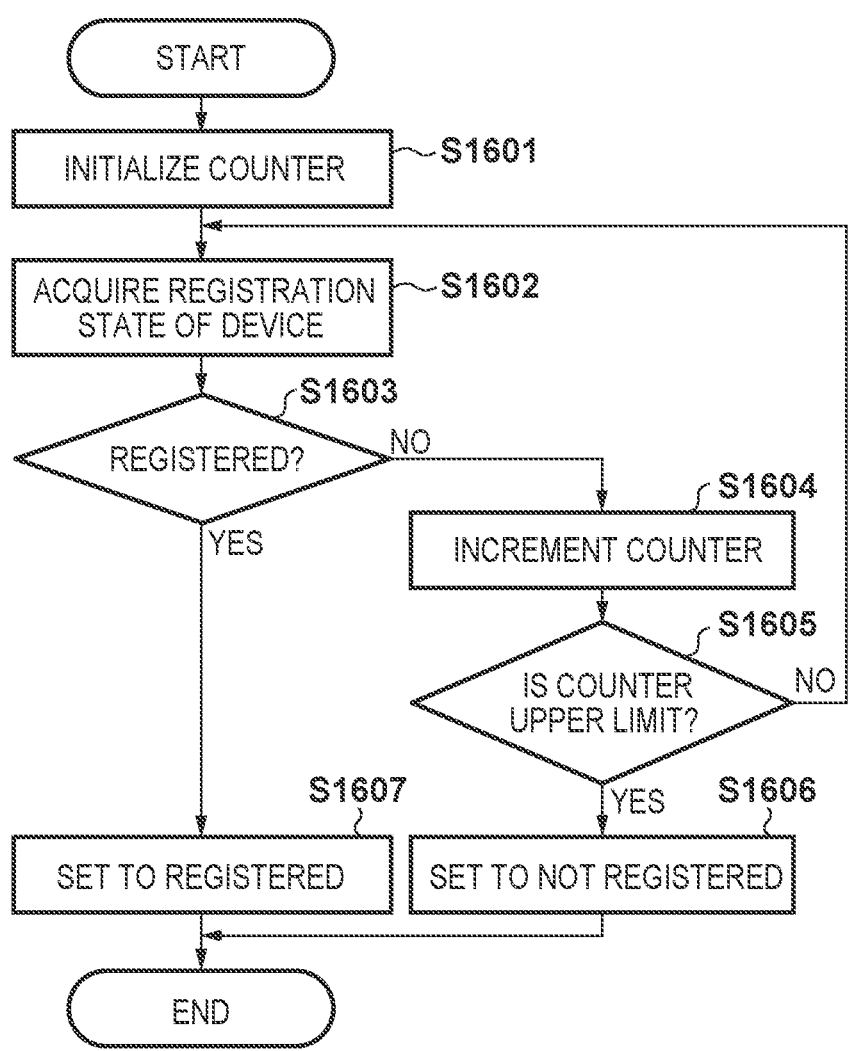

F I G. 18
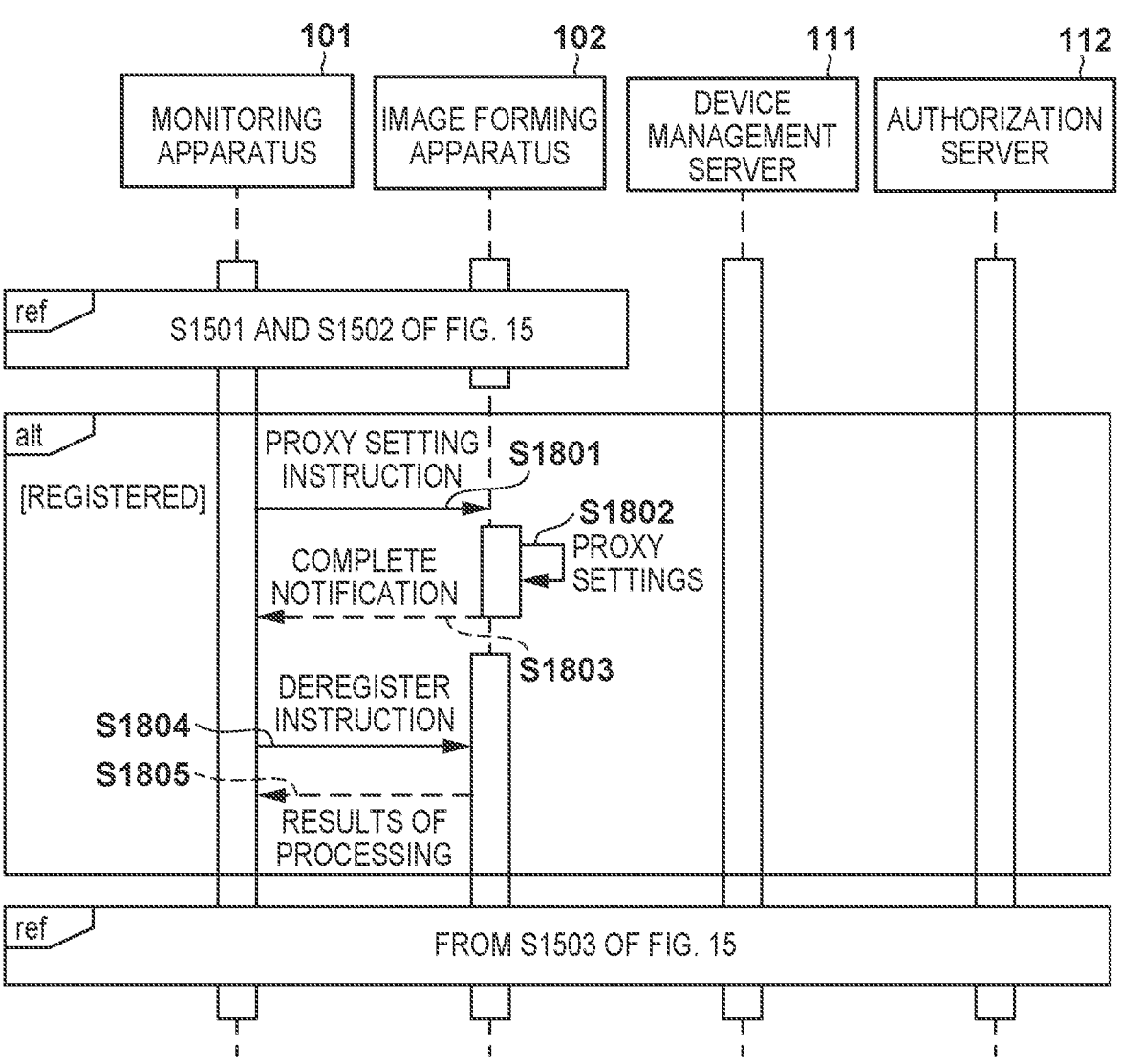

MONITORING APPARATUS AND CONTROL METHOD THEREOF

BACKGROUND OF THE INVENTION

Field of the Invention

The present invention relates to a monitoring apparatus and a control method thereof.

Description of the Related Art

A technology referred to as "Internet of Things (IOT)" that provides services with high additional value by utilizing information from various devices connected to a server via a network has been realized. IoT may include two systems. One of the systems is a device management system that provides a device management service for managing devices connected to the system, a storage service for managing collected information regarding devices, an authorization service that has an authorization function for connecting a device to a cloud service in a secure manner, and the like. The other is a contract service providing system that provides various services such as a device maintenance service and a reporting service in cooperation with the device management system. Japanese Patent Laid-Open No. 2017-126191 suggests a system in which a device that has a self-registration function performs registration processing in place of another device that has a self-registration function, and hands over an obtained authority. In this system, a device registered in an authorization server uses a service of this server by directly communicating with an external server on the Internet. However, a device freely communicating with an external server may lead to concerns regarding the security.

SUMMARY OF THE INVENTION

An aspect of the present disclosure provides a technique for enabling a monitoring apparatus to monitor communication between a device and an external server. According to some embodiments, a monitoring apparatus for monitoring a device, the monitoring apparatus comprising: an obtaining unit configured to obtain a device list from a device management server; a determination unit configured to determine a monitoring method for monitoring a device included in the device list; and a registration processing unit configured to execute first registration processing in order to register a first device that is monitored using a first monitoring method, to an authorization server, and execute second registration processing different from the first registration processing in order to register, to the authorization server, a second device that is monitored using a second monitoring method different from the first monitoring method, wherein the first registration processing includes: instructing the first device to use a designated proxy server, and instructing the first device to transmit, to the authorization server, a request to register the first device to the authorization server, after the first device has started to use the designated proxy server is provided.

Further features of the present invention will become apparent from the following description of exemplary embodiments with reference to the attached drawings.

BRIEF DESCRIPTION OF THE DRAWINGS

FIG. 5 is a block diagram for illustrating an exemplary software configuration of a monitoring apparatus according to the first embodiment.

FIG. 6 is a diagram for illustrating information that is managed by a device management server according to the first embodiment.

FIG. 7 is a diagram for illustrating information that is managed by a monitoring apparatus according to the first embodiment.

FIG. 8 is a diagram for illustrating information that is managed by an authorization server according to the first embodiment.

FIG. 9 is a sequence diagram for illustrating an example of processing for registering the monitoring apparatus and image forming apparatuses according to the first embodiment.

FIG. 11 is a schematic diagram for illustrating a screen example for presenting tenant information according to the first embodiment.

FIG. 12 is a sequence diagram for illustrating an example of self-registration processing of the monitoring apparatus according to the first embodiment.

FIG. 14 is a schematic diagram for illustrating a screen example for obtaining settings of a monitoring method according to the first embodiment.

FIG. 15 is a sequence diagram for illustrating an example of self-registration processing of an image forming apparatus according to the first embodiment.

FIG. 16 is a flowchart for illustrating an example of processing for confirming a registration state according to the first embodiment.

FIG. 18 is a sequence diagram for illustrating an example of self-registration processing of an image forming apparatus according to a second embodiment.

DESCRIPTION OF THE EMBODIMENTS

Figure 1:
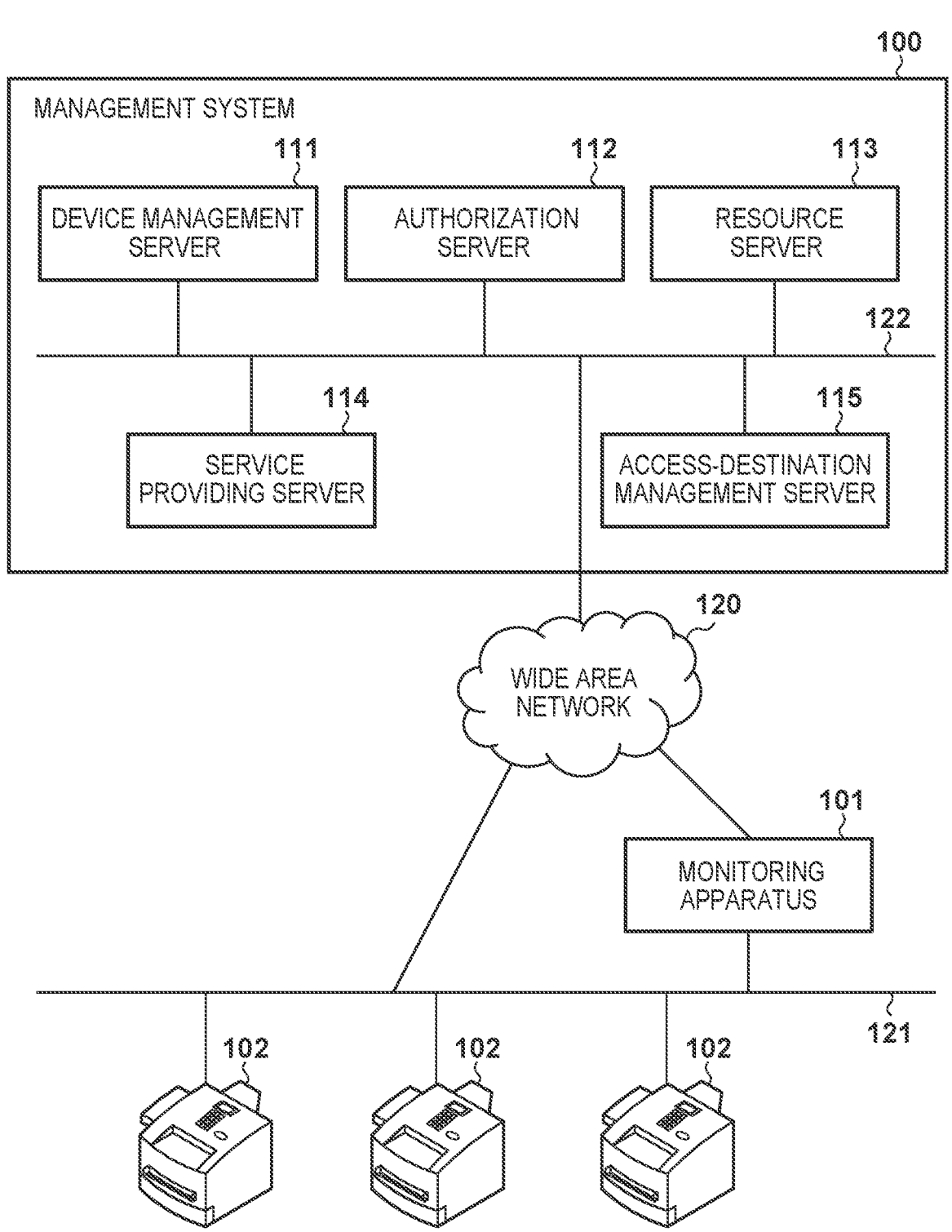
FIG. 1 is a block diagram for illustrating an exemplary network configuration that includes a management system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Network Configuration

An exemplary network configuration that includes a management system 100 according to a first embodiment will be described with reference to FIG. 1. The management system 100 manages one or more devices. In the first embodiment, image forming apparatuses 102 are handled as examples of such devices that are managed by the management system 100. The management system 100 may manage other devices such as home electrical appliances, lighting equipment, air-conditioning equipment, and sensors, in place of or in addition to the image forming apparatuses 102. When the management system 100 manages a device other than the image forming apparatuses 102, each image forming apparatus 102 in the following description is replaced with the device. FIG. 1 shows three image forming apparatuses 102 connected to the same local area network (LAN) 121, as the devices that are managed by the management system 100. Alternatively, the management system 100 may manage another number of devices, or may manage devices separately connected to a plurality of LANs.

The management system 100 includes a device management server 111, an authorization server 112, a resource server 113, a service providing server 114, and an access-destination management server 115. The servers may be realized by providing, as services, functions of the servers operating as application servers on one or more server computers. In addition, the servers may operate as application servers on a virtual machine that uses hardware resources on one or more computers. In addition, alternatively, the management system 100 may be regarded as being constituted by only some of these constituent elements, and may include another constituent element.

A monitoring apparatus 101 is connected to the same LAN 121 as that connected to the image forming apparatuses 102 that are management targets. The management system 100 is connected to a network 122 that is different from the LAN 121. The monitoring apparatus 101 can communicate with a server (the device management server 111 and the like) within the management system 100, via a wide area network 120 such as the Internet.

Alternatively, at least one of the plurality of servers in the management system 100 may be connected to the LAN 121. The plurality of servers in the management system 100 may be disposed separately in a plurality of LANs. At least one of the plurality of servers in the management system 100 may be disposed on a cloud.

The monitoring apparatus 101 monitors the image forming apparatuses 102 that are management targets. The monitoring apparatus 101 collects information from the image forming apparatuses 102, for example. The servers in the management system 100 manage information collected by the monitoring apparatus 101 and the image forming apparatuses 102 that are management targets, and provide various services. The device management server 111 manages information regarding the monitoring apparatus 101 and the image forming apparatuses 102.

The authorization server 112 provides an authorization service for safely connecting the monitoring apparatus 101 and the image forming apparatuses 102 to another server within the management system 100. In the authorization service, authorization processing is performed. The authorization server 112 may provide the authorization service using the OAuth mechanism. The authorization server 112 registers the monitoring apparatus 101 and the image forming apparatuses 102 to itself, as clients associated with specific tenants. Each tenant refers to unitary management allocated to a customer that has signed a service use contract and is to be managed. The authorization server 112 manages data for each tenant. The authorization server 112 issues a token for clients thereof. By using the token, the monitoring apparatus 101 and the image forming apparatuses 102 can use a service provided by a server other than the authorization server 112. The authorization server 112 may further provide an authentication function. The authorization server 112 that provides the authentication function may be referred to as an "authentication authorization server".

The resource server 113 manages information collected from the image forming apparatuses 102. Information that is managed by the resource server 113 may be used for providing services. In response to a request from each of the monitoring apparatus 101 and the image forming apparatuses 102, the access-destination management server 115 provides the uniform resource locators (URLs) of servers (for example, the device management server 111 and the resource server 113) that the apparatus accesses. The service providing server 114 provides services such as a maintenance service and a reporting service, using the information regarding the image forming apparatuses 102 managed by the resource server 113. The service providing server 114 may provide, to the user, a web user interface (UI) for setting information regarding the monitoring apparatus 101 and the image forming apparatuses 102 that are management targets.

Hardware Configuration of Image Forming Apparatus

An exemplary hardware configuration of an image forming apparatus 102 will be described with reference to FIG. 2. The image forming apparatus 102 may include the constituent elements shown in FIG. 2. The image forming apparatus 102 does not need to include some of the constituent elements shown in FIG. 2, and may include a constituent element that is not shown in FIG. 2.

A central processing unit (CPU) 201 performs overall control of devices connected to a system bus 206 by executing software stored in a read only memory (ROM) 202 or a hard disk drive (HDD) 205. A random access memory (RAM) 203 functions as a work area of the CPU 201 or the like. A hard disk controller (HDC) 204 controls writing/reading of data to/from the HDD 205.

A reader interface (I/F) 207 is connected to a reader unit 212. The reader I/F 207 controls the reader unit 212. A printer I/F 208 is connected to a printer unit 213. The printer I/F 208 controls the printer unit 213. An operation I/F 209 is connected to an operation unit 214. The operation I/F 209 controls display on the operation unit 214 and user input through the operation unit 214. The operation unit 214 is constituted by buttons for performing operations and a display unit, for example. A switch I/F 210 is connected to a switch unit 215. The switch I/F 210 controls operations performed through the switch unit 215. The switch unit 215 is constituted by a switch for performing an operation and the like. A network I/F 211 transmits/receives data from/to an external apparatus such as a host computer via the LAN 121.

Figure 2:
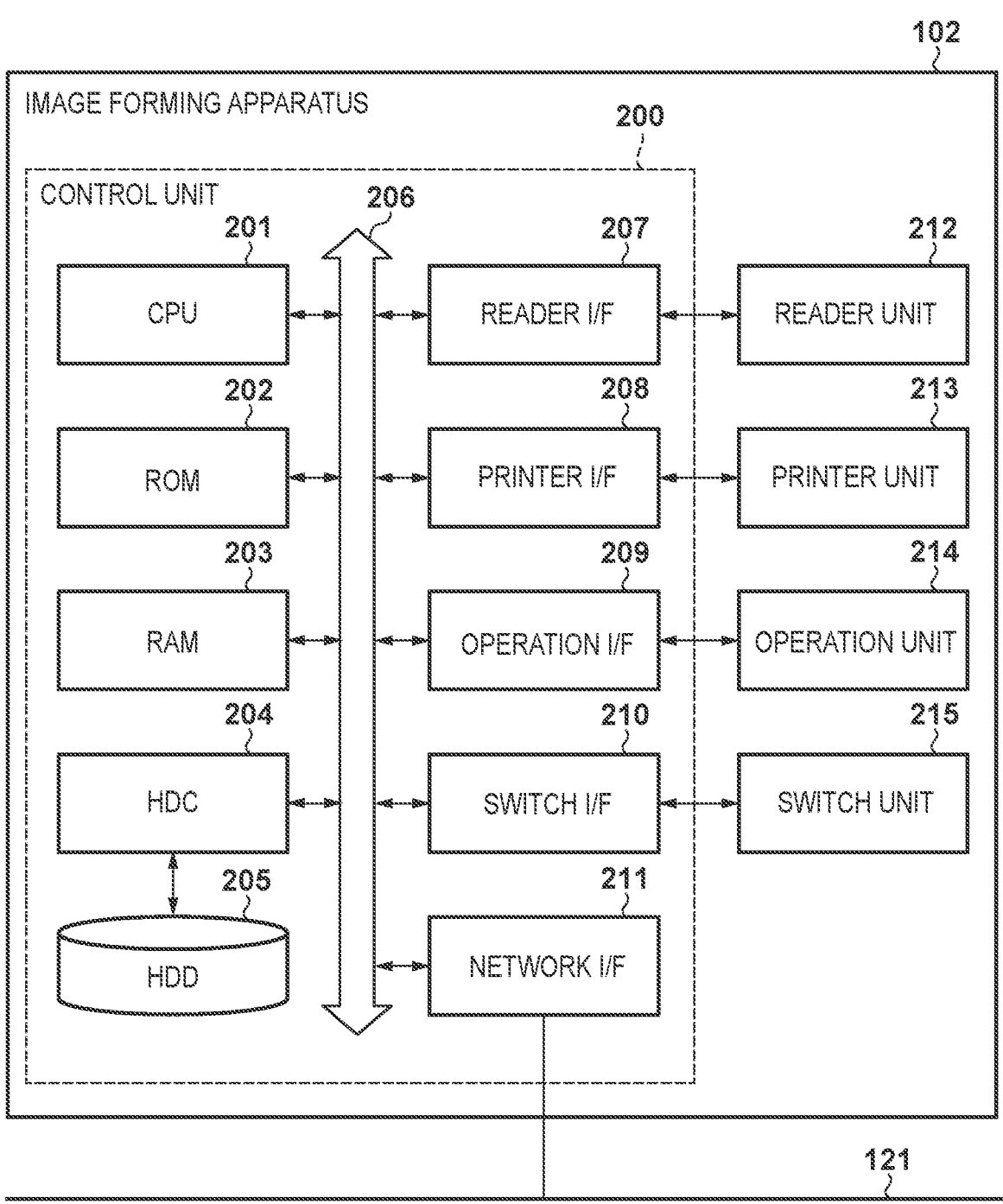
FIG. 2 is a block diagram for illustrating an exemplary hardware configuration of an image forming apparatus according to the first embodiment.

In FIG. 2, a portion surrounded by a broken line represents a control unit 200. The control unit 200 controls various apparatuses and interfaces connected to the image forming apparatus 102, and performs overall control of the image forming apparatus 102. The reader unit 212 reads an image of a document, and outputs image data indicating the image to the printer unit 213 in accordance with an instruction from the user, or stores the image data to the HDD 205. The reader unit 212 may transmit the image data to a host computer connected to the LAN 121 via the network I/F 211.

The printer unit 213 prints a document read by the reader unit 212, and image data stored in the HDD 205. The printer unit 213 may receive, via the network I/F 211, a print job from the host computer connected to the LAN 121, and print the print job.

Hardware Configuration of Computer

Figure 3:
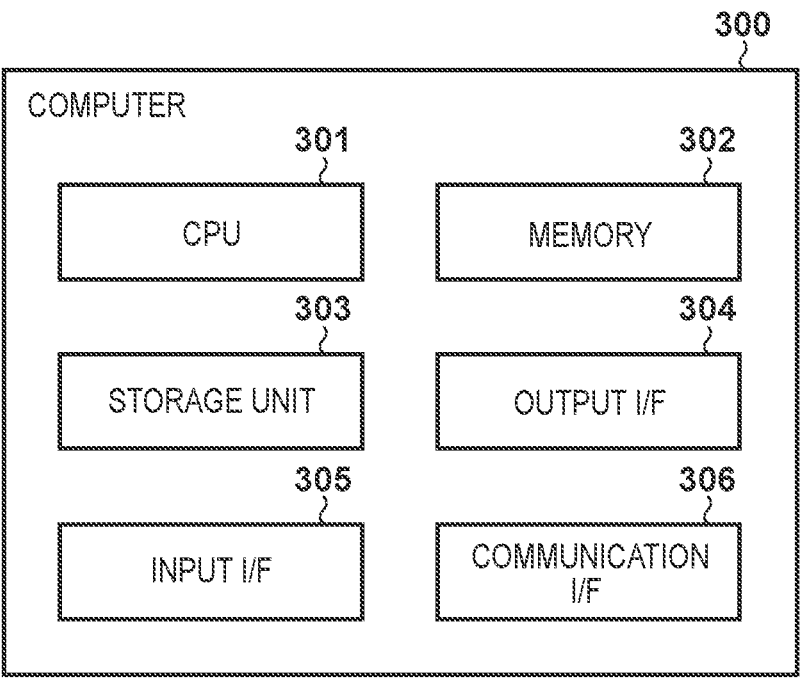
FIG. 3 is a block diagram for illustrating an exemplary hardware configuration of a computer according to the first embodiment.

An exemplary hardware configuration of a computer 300 will be described with reference to FIG. 3. The computer 300 may include the constituent elements shown in FIG. 3. The computer 300 does not need to include some of the constituent elements shown in FIG. 3, and may include a constituent element that is not shown in FIG. 3. The computer 300 may be used as any of the monitoring apparatus 101 and the servers in the management system 100 (for example, the device management server 111).

A CPU 301 reads out a program from a storage unit 303 to a memory 302, and executes this program. The CPU 301 is an example of a general-purpose processor. The memory 302 may be constituted by a RAM, for example. The storage unit 303 stores an operating system (OS), an application programs, data, and the like. The storage unit 303 may be constituted by an HDD, for example. An output I/F 304 is an interface for connecting an output device such as a display to the computer 300. The output I/F 304 outputs a result of executing a program and the like, to the output device. An input I/F 305 is an interface for connecting input devices such as a keyboard and a pointing device to the computer 300. The input I/F 305 obtains operation input of the user from through an input device. A communication I/F 306 is a network interface for performing communication with an external system or apparatus.

Software Configuration of Image Forming Apparatus

Figure 4:
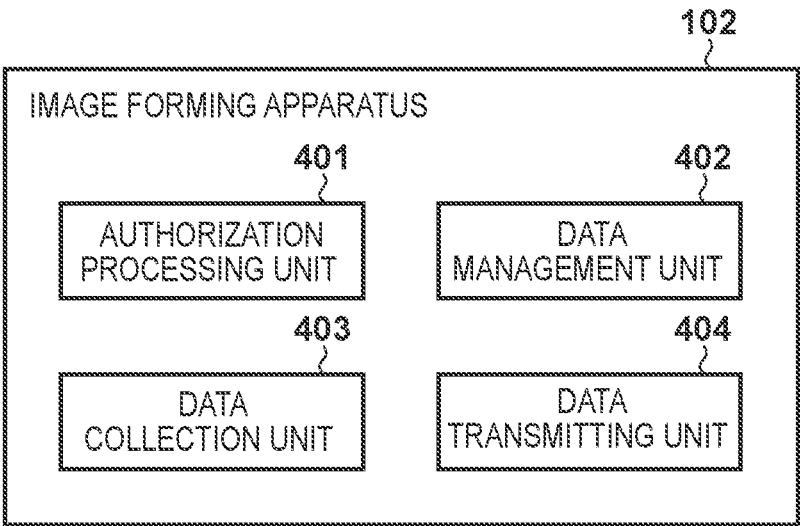
FIG. 4 is a block diagram for illustrating an exemplary software configuration of the image forming apparatus according to the first embodiment.

An exemplary software configuration of an image forming apparatus 102 will be described with reference to FIG. 4. The image forming apparatus 102 may include the constituent elements shown in FIG. 4. The image forming apparatus 102 does not need to include some of the constituent elements shown in FIG. 4, and may include a constituent element that is not shown in FIG. 4. The constituent elements of the image forming apparatus 102 may be realized by the CPU 201 of the image forming apparatus 102 executing a program loaded to the RAM 203, for example. The functions of the constituent elements of the image forming apparatus 102 will be described further in detail with reference to sequence diagrams and flowcharts to be described below.

An authorization processing unit 401 performs self-registration processing for registration to the authorization server 112, obtains and manages a token, and the like. The self-registration processing for registration to the authorization server 112 is processing for registering the apparatus to which the authorization processing unit 401 belongs (for example, the image forming apparatus 102) as a client to the authorization server 112. The self-registration processing may include transmitting, to the authorization server 112, a request to register the apparatus to which the authorization processing unit 401 belongs (for example, the image forming apparatus 102) to the authorization server 112. The authorization processing unit 401 may communicate with the monitoring apparatus 101 in order to perform settings used for monitoring the image forming apparatus 102.

A data management unit 402 manages data such as the settings of a proxy server. A data collection unit 403 collects data to be transmitted to the resource server 113, from a constituent element of the image forming apparatus 102. A data transmitting unit 404 transmits the data collected by the data collection unit 403 to the resource server 113.

Some of the plurality of image forming apparatuses 102 that are managed by the management system 100 do not need to include the authorization processing unit 401. An image forming apparatus 102 that does not include the authorization processing unit 401 cannot execute self-registration processing. For this reason, as will be described later, in place of the image forming apparatus 102, the monitoring apparatus 101 registers the image forming apparatus 102 to the authorization server 112.

Software Configuration of Monitoring Apparatus

An exemplary software configuration of the monitoring apparatus 101 will be described with reference to FIG. 5. The monitoring apparatus 101 may include the constituent elements shown in FIG. 5. The monitoring apparatus 101 does not need to include some of the constituent elements shown in FIG. 5, and may include a constituent element that is not shown in FIG. 5. The constituent elements of the monitoring apparatus 101 may be realized by the CPU 301 of the computer 300 that operates as the monitoring apparatus 101 executing a program loaded to the memory 302, for example. The functions of the constituent elements of the monitoring apparatus 101 will be described further in detail with reference to sequence diagrams and flowcharts to be described later.

A device management unit 501 manages the image forming apparatuses 102 that are managed by the management system 100. The device management unit 501 manages the image forming apparatuses 102 connected to the same LAN 121, for example. Specifically, the device management unit 501 may instruct each image forming apparatus 102 to perform setting of a proxy server, register the monitoring apparatus 101 and the image forming apparatus 102 to the authorization server 112, and manage a token issued by the authorization server 112.

A proxy unit 502 causes the monitoring apparatus 101 to operate as a proxy server. The proxy unit 502 may cause the monitoring apparatus 101 to operate as a proxy server for each image forming apparatus 102, for example. Accordingly, communication performed from the image forming apparatus 102 is collected in the monitoring apparatus 101. Instead of causing the monitoring apparatus 101 to operates as a proxy server, the proxy unit 502 may cause another apparatus connected to the LAN 121 to operate as a proxy server. In this case, the proxy unit 502 may obtain communication data between a server in the management system 100 and the image forming apparatus 102, from the other apparatus that operates as a proxy server. A multi-stage proxy may be configured by another proxy server being disposed on a communication path between a proxy server provided by the proxy unit 502 and the wide area network 120.

The monitoring apparatus 101 that operates as a proxy server receives data transmitted to an external apparatus (for example, a server in the management system 100) via the wide area network 120 by an image forming apparatus 102, and transmits the data to this external apparatus instead of the image forming apparatus 102. In addition, the monitoring apparatus 101 that operates as a proxy server receives data transmitted from an external apparatus to an image forming apparatus 102 via the wide area network 120, and transmits this data to the image forming apparatus 102.

A data management unit 503 manages information for monitoring the image forming apparatuses 102. This information may include status information indicating whether or not each image forming apparatus 102 is managed by the monitoring apparatus 101, for example. A task management unit 504 manages various tasks such as self-registration processing for registration of the monitoring apparatus 101 and monitoring and registration of the image forming apparatuses 102. A screen control unit 505 outputs a screen to an output device via the output I/F 304, and obtains input information from an input device via the input I/F 305. The screen control unit 505 supplies the obtained input information to a constituent element (for example, the data management unit 503) that processes this information.

Information That Is Managed by Device Management Server

Information that is managed by the device management server 111 will be described with reference to FIG. 6. In the example in FIG. 6, the device management server 111 manages information in a table format. Alternatively, the device management server 111 may manage information in another format. The device management server 111 manages an agent management table 600 and a device management table 610. These tables may be stored in the storage unit 303 of the computer 300 that operates as the device management server 111.

The agent management table 600 is a table for managing information regarding the monitoring apparatus 101. The monitoring apparatus 101 can register the image forming apparatuses 102 to the authorization server 112 in place of the image forming apparatuses 102. For this reason, the monitoring apparatus 101 may also be referred to as an "agent". The agent management table 600 does not need to include some of the columns shown in FIG. 6, and may include a column that is not shown in FIG. 6. Similarly, another table to be described later does not need to include some of the illustrated columns, and may include a column that is not illustrated.

An agent ID 601 refers to information for uniquely identifying a monitoring apparatus 101 in the management system 100. The agent ID 601 may be allocated to the monitoring apparatus 101 by the device management server 111. A tenant ID 602 refers to information for uniquely identifying a tenant to which the monitoring apparatus 101 identified by the agent ID 601 belongs. The tenant ID 602 may be allocated to the tenant by a server (not illustrated) that manages the tenant. A customer ID 603 refers to information for uniquely identifying a customer of the tenant identified by the tenant ID 602. The customer ID 603 may be allocated to the customer by a server (not illustrated) that manages the tenant. A tenant name 604 is the name of the tenant that is identified by the tenant ID 602. The tenant name 604 may be determined by the customer of the tenant.

A client ID 605 refers to information for uniquely identifying a client of the authorization server 112 in the management system 100. A client of the authorization server 112 refers to an entity that is registered in the authorization server 112. In the first embodiment, the monitoring apparatus 101 and the image forming apparatuses 102 can be clients of the authorization server 112. Each client ID 605 may be allocated to a client by the authorization server 112.

The device management table 610 is a table for managing information regarding the image forming apparatuses 102. A server provided device ID 611 refers to information for uniquely identifying each image forming apparatus 102, in the management system 100. The server provided device ID 611 may be allocated to the image forming apparatus 102 by the device management server 111. A serial number 612 is a number uniquely allocated to each image forming apparatus 102 by the manufacturer of the image forming apparatus 102. A tenant ID 613 refers to information for uniquely identifying a tenant to which the image forming apparatus 102 identified by the server provided device ID 611 belongs.

The tenant ID 613 has the same code scheme as the tenant ID 602. An agent ID 614 refers to information for uniquely identifying the monitoring apparatus 101 associated with the image forming apparatus 102 identified by the server provided device ID 611. The agent ID 614 has the same code scheme as the agent ID 601.

The device management server 111 may add a new record to the agent management table 600 and the device management table 610 in accordance with an instruction from the service providing server 114. The service providing server 114 may obtain information regarding the monitoring apparatus 101 and the image forming apparatuses 102 that are managed by the management system 100, from the user via a web user interface, or from another apparatus via a Web API.

Information That is Managed by Monitoring Apparatus

Information that is managed by the monitoring apparatus 101 will be described with reference to FIG. 7. In the example in FIG. 7, the monitoring apparatus 101 manages information in a table format. Alternatively, the monitoring apparatus 101 may manage information in another format. The monitoring apparatus 101 manages a device management table 700. This table may be stored in the storage unit 303 of the computer 300 that operates as the monitoring apparatus 101.

The device management table 700 is a table for managing information regarding the image forming apparatuses 102. Every time information regarding an image forming apparatus 102 is obtained, the monitoring apparatus 101 adds a new record to the device management table 700. Information regarding the image forming apparatuses 102 is obtained as a list of devices that are management targets, for example, from the device management server 111. The devices that are management targets are devices that are to be monitored by the monitoring apparatus 101.

A device ID 701 refers to information for uniquely identifying an image forming apparatus 102, in the monitoring apparatus 101. The device ID 701 may be allocated to the image forming apparatus 102 by the monitoring apparatus 101. A serial number 702 is a number uniquely allocated to each image forming apparatus 102 by the manufacturer of the image forming apparatus 102. An internet protocol (IP) address 703 is the IP address of the image forming apparatus 102 identified by the device ID 701.

A management state 704 indicates whether or not the image forming apparatus 102 identified the device ID 701 is managed by the management system 100. An image forming apparatus 102 for which the management state 704 is "targeted" is managed by the management system 100. Ab image forming apparatus 102 for which the management state 704 is "not targeted" is not managed by the management system 100.

A registration state 705 indicates whether or not the image forming apparatus 102 identified by the device ID 701 is registered in the authorization server 112. An image forming apparatus 102 for which the registration state 705 is "registered" is registered in the authorization server 112. An image forming apparatus 102 registered in the authorization server 112 may be regarded as an image forming apparatus 102 registered in the management system 100. An image forming apparatus 102 for which the registration state 705 is "not registered" is not registered in the authorization server 112. The image forming apparatus 102 for which the registration state 705 is "not registered" may have been registered in the authorization server 112 in the past, or may have never been registered to the authorization server 112.

A monitoring method 706 indicates a method for monitoring the image forming apparatus 102 identified by the device ID 701. An image forming apparatus 102 for which the monitoring method 706 is "proxy" is monitored by the monitoring apparatus 101 using a proxy method. The proxy method refers to a method in which the image forming apparatus 102 communicates with a server via a proxy server, and communication data transmitted or received by the image forming apparatus 102 via this proxy server is monitored by the monitoring apparatus 101. An image forming apparatus 102 for which the monitoring method 706 is "polling" is monitored by the monitoring apparatus 101 using a polling method. The polling method refers to a method in which the monitoring apparatus 101 monitors information obtained from the image forming apparatus 102 by the monitoring apparatus 101 by performing polling.

A server provided device ID 707 is a server provided device ID allocated by the image forming apparatus 102 identified by the device ID 701. The server provided device ID 707 has the same code scheme as the server provided device ID 611.

Information That is Managed by Authorization Server

Information that is managed by the authorization server 112 will be described with reference to FIG. 8. In the example in FIG. 8, the authorization server 112 manages information in a table format. Alternatively, the authorization server 112 may manage information in another format. The authorization server 112 manages an agent activation code management table 800, a device activation code management table 810, a registration key management table 820, a client management table 830, and a credential management table 840. These tables may be stored in the storage unit 303 of the computer 300 that operates as the authorization server 112.

The agent activation code management table 800 is a table for managing activation codes related to the monitoring apparatus 101. The authorization server 112 adds a new record to the agent activation code management table 800 every time an activation code is issued for the monitoring apparatus 101.

An activation code 801 is an activation code issued for the monitoring apparatus 101 by the authorization server 112. An activation code may be issued for each monitoring apparatus 101. An agent ID 802 is an agent ID of the monitoring apparatus 101 for which the activation code 801 has been issued. The agent ID 802 has the same code scheme as the agent ID 601. A customer ID 803 refers to information for uniquely identifying a customer of the tenant to which the monitoring apparatus 101 identified by the agent ID 802 belongs. The customer ID 803 has the same code scheme as the customer ID 603. An expiration date 804 is an expiration date set for the activation code 801.

The device activation code management table 810 is a table for managing activation codes related to the image forming apparatuses 102. Every time an activation code is issued for an image forming apparatus 102, the authorization server 112 adds a new record to the device activation code management table 810.

An activation code 811 is an activation code issued for an image forming apparatus 102 by the authorization server 112. An activation code may be issued for each image forming apparatus 102. A serial number 812 is a number uniquely allocated to an image forming apparatus 102 for which the activation code 811 has been issued, by the manufacturer of the image forming apparatus 102. A device registration key 813 is a device registration key used for issuing the activation code 811. An expiration date 814 is an expiration date set for the activation code 811.

The registration key management table 820 is a table for managing device registration keys. Every time a device registration key is issued, the authorization server 112 adds a new record to the registration key management table 820.

A device registration key 821 is a device registration key issued by the authorization server 112. A device registration key may be issued for each tenant. Alternatively, the device registration key may be issued for each image forming apparatus 102. A tenant ID 822 refers to information for uniquely identifying a tenant for which the device registration key 821 has been issued. The tenant ID 822 has the same code scheme as the tenant ID 602. An expiration date 823 is an expiration date set for the device registration key 821.

The client management table 830 is a table for managing information regarding clients, in other words the monitoring apparatus 101 and the image forming apparatuses 102. A client ID 831 refers to information for uniquely identifying a client of the authorization server 112, in the management system 100. When the client is the monitoring apparatus 101, the client ID 831 may be the agent ID of the monitoring apparatus 101. When the client is an image forming apparatus 102, the client ID 831 may be the server provided device ID of the image forming apparatus 102. The client ID 831 has the same code scheme as the client ID 605.

A serial number 832 is a number uniquely allocated to an image forming apparatus 102 by the manufacturer of the image forming apparatus 102. If the client is the monitoring apparatus 101, the serial number 832 may be blank. A tenant ID 833 refers to information for uniquely identifying a tenant to which the client identified by the client ID 831 belongs. The tenant ID 833 has the same code scheme as the tenant ID 602.

The authorization server 112 may add a new record to the client management table 830 in accordance with an instruction from the service providing server 114. The authorization server 112 may obtain information regarding the monitoring apparatus 101 and the image forming apparatuses 102 that are managed by the management system 100, from the user via the web user interface, or from another apparatus via a Web API.

The credential management table 840 is a table for managing credentials issued for the clients, in other words, the monitoring apparatus 101 and the image forming apparatuses 102. Every time a credential is issued, the authorization server 112 adds a new record to the credential management table 840.

A client ID 841 may be information for uniquely identifying a client of the authorization server 112, in the management system 100. The client ID 841 has the same code scheme as the client ID 831. A credential 842 is a credential (for example, a private key) issued for a client identified by the client ID 841. A credential may be issued for each client.

Processing for Registering Monitoring Apparatus and Image Forming Apparatuses

Processing for registering the monitoring apparatus 101 and image forming apparatuses 102 will be described with reference to FIG. 9. Operations performed by apparatuses and servers in this processing may be realized by the CPUs of the apparatuses and the servers executing programs loaded in the memories thereof. Alternatively, some of the operations may be executed by a dedicated circuit such as an application specific integrated circuit (ASIC). The same applies to processing that will be described later with reference to drawings.

In step S901, the screen control unit 505 of the monitoring apparatus 101 obtains, from a user 900 of the monitoring apparatus 101, an instruction to start processing for registering the monitoring apparatus 101 and image forming apparatuses 102. This instruction may be accompanied by information that is used for registration processing. The information that is used for registration processing may include an agent ID and customer IDs. As described above, an agent ID refers to information for uniquely identifying a monitoring apparatus 101, in the management system 100. As described above, a customer ID refers to information for uniquely identifying a customer of a tenant, in the management system 100. Furthermore, the monitoring apparatus 101 may obtain, from the user 900, information that is used for communication with servers in the management system 100.

In step S902, the task management unit 504 of the monitoring apparatus 101 requests information regarding the tenant to which the monitoring apparatus 101 belongs (hereinafter, referred to as tenant information) from the authorization server 112. This request may be accompanied by a credential and the agent ID and customer IDs obtained in step S901. A default credential stored in the data management unit 503 of the monitoring apparatus 101 in advance may be used as the credential.

In step S903, receiving the request for tenant information, the authorization server 112 transmits tenant information to the monitoring apparatus 101. The tenant information may include the tenant ID and the tenant name of the tenant to which the monitoring apparatus 101 belongs. The authorization server 112 may store tenant IDs and the tenant names of tenants in advance, or may inquire of the device management server 111 about the tenant ID and the tenant name.

In step S904, the screen control unit 505 of the monitoring apparatus 101 presents the tenant information to the user 900. The user 900 confirms the presented tenant information, and determines whether or not to continue registration processing. If the tenant information cannot be obtained in step S903, the screen control unit 505 presents an error to the user 900. In this case, the monitoring apparatus 101 may end the processing in FIG. 9.

In step S905, the screen control unit 505 of the monitoring apparatus 101 obtains an instruction to continue registration processing, from the user 900. Alternatively, when an instruction to suspend registration processing is obtained from the user 900, the screen control unit 505 ends the procedure.

In step S906, obtaining, from the user 900, the instruction to continue registration processing, the task management unit 504 of the monitoring apparatus 101 executes self-registration processing for registering the monitoring apparatus 101 itself. This processing will be described later in detail. The task management unit 504 obtains a token from the authorization server 112 by performing the self-registration processing. This token is used by the monitoring apparatus 101 in order to use a service provided by a server in the management system 100 that is other than the authorization server 112.

In step S907, in accordance with self-registration processing of the monitoring apparatus 101 being completed, the screen control unit 505 of the monitoring apparatus 101 notifies the user 900 that registration of the monitoring apparatus 101 has been completed. When an error occurs in self-registration processing of the monitoring apparatus 101, and registration of the monitoring apparatus 101 cannot be completed, the screen control unit 505 may notify the user 900 of the error. In this case, the monitoring apparatus 101 may end the processing in FIG. 9.

In step S908, the task management unit 504 of the monitoring apparatus 101 requests a list of image forming apparatuses 102 that are management targets (hereinafter, referred to as a "device list") from the device management server 111, using the token obtained in step S906. This request may be accompanied by the agent ID obtained in step S901.

In step S909, the device management server 111 specifies an image forming apparatus 102 associated with the received agent ID, by referencing the device management table 610. The device management server 111 then transmits the device list that includes information regarding the specified image forming apparatus 102 to the monitoring apparatus 101. In this manner, the monitoring apparatus 101 obtains the device list from the device management server 111. Information regarding the image forming apparatus 102 included in the device list may include the server provided device ID 611, the serial number 612, and the tenant ID 613 of the image forming apparatus 102. Furthermore, the information regarding the image forming apparatus 102 included in the device list may include the IP address, the host name, the MAC address, and the like of the image forming apparatus 102.

The data management unit 503 of the monitoring apparatus 101 generates or updates a record in the device management table 700, for the image forming apparatus 102 included in the device list. Specifically, when a record that has a server provided device ID 707 that matches the server provided device ID included in the device list is included in the device management table 700, the data management unit 503 updates information of this existing record. If such a record is not included in the device management table 700, the data management unit 503 generates a new record.

The data management unit 503 may set information included in the device list, as the device ID 701, the serial number 702, the IP address 703, and the server provided device ID 707 of the new record. The data management unit 503 may set the management states 704 of the existing records and the new record to "managed". The data management unit 503 may change the management state 704 in accordance with an instruction from the user 900, the service providing server 114, or the like. The data management unit 503 may set the registration state 705 of the new record to "not registered". The data management unit 503 may change the registration state 705 to "registered" in accordance with the image forming apparatus 102 being registered in the authorization server 112. The data management unit 503 sets the monitoring method 706 of the new record to the proxy method ("proxy") or the polling method ("polling"). This setting may be performed based on a rule set in advance. The data management unit 503 may change the monitoring method 706 in accordance with an instruction from the user 900, an instruction from the service providing server 114, or the like.

In step S910, the screen control unit 505 of the monitoring apparatus 101 notifies the user 900 that the device list has been obtained. If an error occurs when obtaining the device list, and the device list cannot be obtained, the screen control unit 505 may notify the user 900 of the error. In this case, the monitoring apparatus 101 may end the processing in FIG. 9.

In step S911, obtaining the device list from the device management server 111, the task management unit 504 of the monitoring apparatus 101 executes processing for registering the image forming apparatus 102 included in the device list. This processing will be described later in detail.

The monitoring apparatus 101 then starts monitoring the image forming apparatus 102 that is a management target.

Connection Settings Screen

Figure 10:
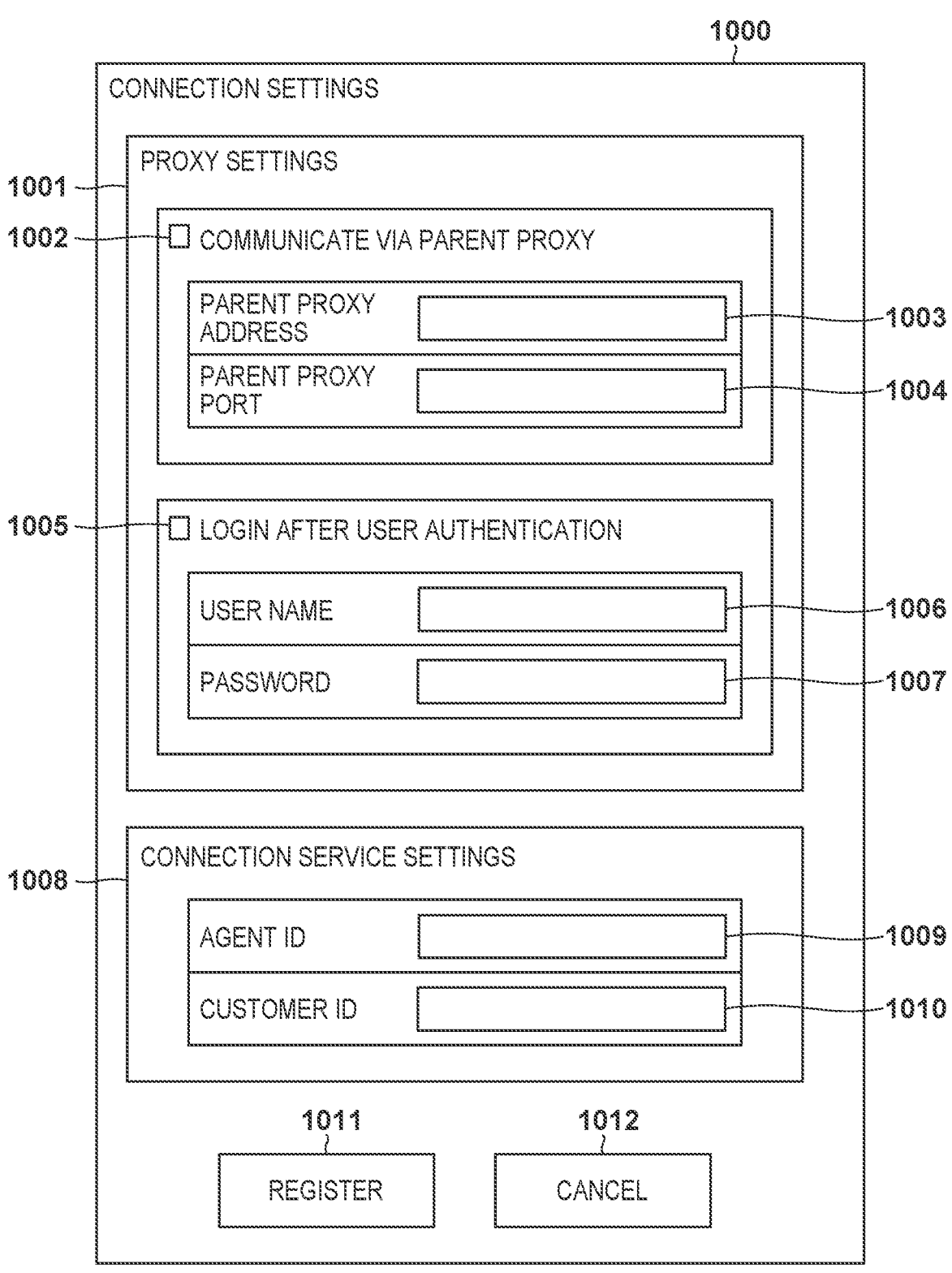
FIG. 10 is a schematic diagram for illustrating a screen example for obtaining an instruction to perform registration processing according to the first embodiment.

An example of a screen 1000 that is displayed by the screen control unit 505 of the monitoring apparatus 101 in order to obtain, from the user 900, an instruction to start registration processing in step S901 in FIG. 9 will be described with reference to FIG. 10. The monitoring apparatus 101 obtains connection settings from the user 900 through the screen 1000. The screen 1000 may be displayed on a display device connected to the output I/F 304 of the computer 300 that operates as the monitoring apparatus 101. The screen control unit 505 displays the screen 1000 in accordance with an instruction from the user 900.

The screen 1000 includes a proxy settings section 1001, a connection service settings section 1008, a register button 1011, and a cancel button 1012. The proxy settings section 1001 is a section for obtaining the settings of a proxy server provided on the communication path between the monitoring apparatus 101 and the wide area network 120. Such a proxy server is referred to as a "parent proxy.

The proxy settings section 1001 includes a checkbox 1002, and text boxes 1003 and 1004. The monitoring apparatus 101 uses the checkbox 1002 to obtain, from the user 900, an instruction to connect the monitoring apparatus 101 to the wide area network 120 via the parent proxy. The monitoring apparatus 101 uses the text box 1003 to obtain the IP address of the parent proxy from the user 900. The monitoring apparatus 101 uses the text box 1004 to obtain the port number of the parent proxy from the user 900. The monitoring apparatus 101 may enable input to the text boxes 1003 and 1004 when the checkbox 1002 is on. The monitoring apparatus 101 may disable input to the text boxes 1003 and 1004 when the checkbox 1002 is off.

The proxy settings section 1001 also includes a checkbox 1005 and text boxes 1006 and 1007. The monitoring apparatus 101 uses the checkbox 1005 to obtain, from the user 900, an instruction to use a credential (for example, a password) for connection to the parent proxy. The monitoring apparatus 101 uses the text box 1006 to obtain a user name that is used for login, from the user 900. The monitoring apparatus 101 uses the text box 1007 to obtain a password that is used for login, from the user 900. The monitoring apparatus 101 may enable input to the text boxes 1006 and 1007 when the checkbox 1005 is on. The monitoring apparatus 101 may disable input to the text boxes 1006 and 1007 when the checkbox 1005 is off.

The connection service settings section 1008 is a section for the monitoring apparatus 101 to obtain information that is used to request registration of the monitoring apparatus 101 to the authorization server 112. The connection service settings section 1008 includes text boxes 1009 and 1010. The monitoring apparatus 101 uses the text box 1009 to obtain an agent ID from the user 900. The monitoring apparatus 101 uses the text box 1010 to obtain a customer ID from the user 900. The obtained agent ID and customer ID are transmitted to the authorization server 112 as described with reference to FIG. 9.

In accordance with the register button 1011 being pressed by the user 900, the monitoring apparatus 101 obtains the content designated on the proxy settings section 1001 and the connection service settings section 1008, as the instruction in step S901. The monitoring apparatus 101 returns to the previous screen without performing connection settings, in accordance with the cancel button 1012 being pressed by the user 900.

Connection Settings Screen

An example of a screen 1100 that includes the tenant information presented to the user 900 in step S904 in FIG. 9 will be described with reference to FIG. 11. The screen 1100 may be displayed on the display device connected to the output I/F 304 of the computer 300 that operates as the monitoring apparatus 100.

The screen 1100 includes a warning icon, a message that requests confirmation of a tenant, a tenant ID field 1101, a tenant name field 1102, an OK button 1103, and a cancel button 1104. The tenant ID included in the tenant information obtained in step S903 is displayed in the tenant ID field 1101. The tenant name included in the tenant information obtained in step S903 is displayed in the tenant name field 1102.

In accordance with the OK button 1103 being pressed by the user 900, the monitoring apparatus 101 determines that the user 900 has confirmed the tenant information. In accordance with the cancel button 1104 being pressed by the user 900, the monitoring apparatus 101 determines that the user 900 does not desire to continue the processing. In that case, the monitoring apparatus 101 may display the screen 1000 again.

Self-registration Processing of Monitoring Apparatus

Self-registration processing of the monitoring apparatus 101 that is executed in step S906 in FIG. 9 will be described in detail with reference to FIG. 12. In step S1201, the task management unit 504 of the monitoring apparatus 101 requests an activation code from the authorization server 112. This request may be accompanied by a credential, the agent ID obtained in step S901, and the customer ID obtained in step S901. The credential may be a default credential stored in the data management unit 503 of the monitoring apparatus 101 in advance.

In step S1202, the authorization server 112 references the agent activation code management table 800, and specifies a record that has the agent ID 802 and the customer ID 803 that respectively match the agent ID and the customer ID received from the monitoring apparatus 101. If such a record can be specified, the authorization server 112 confirms the validation of the activation code 801 based on the expiration date 804 of this record. Furthermore, the authorization server 112 may confirm the credential received from the monitoring apparatus 101. If the activation code 801 is valid, the authorization server 112 transmits the activation code 801 to the monitoring apparatus 101. When such a record cannot be specified, or the activation code 801 is invalid, the authorization server 112 may transmit an error to the monitoring apparatus 101.

In step S1203, receiving the activation code, the task management unit 504 of the monitoring apparatus 101 requests the authorization server 112 to activate the monitoring apparatus 101. This request may be accompanied by the activation code obtained in step S1202 and the agent ID obtained in step S901.

In step S1204, the authorization server 112 references the agent activation code management table 800, and specifies a record that has the activation code 801 and the agent ID 802 that respectively match the activation code and agent ID received from the monitoring apparatus 101. If such a record can be specified, the authorization server 112 confirms the validity of the activation code 801 based on the expiration date 804 of this record. If the activation code 801 is valid, the authorization server 112 issues a credential. The authorization server 112 also adds a new record to the credential management table 840. The authorization server 112 sets the agent ID received from the monitoring apparatus 101, as the client ID 841, and sets the issued credential as the credential 842.

In step S1205, the authorization server 112 transmits the issued credential to the monitoring apparatus 101. When a record cannot be specified in step S1204, or the activation code 801 is invalid, the authorization server 112 may transmit an error to the monitoring apparatus 101.

The authorization server 112 may regard a client that has the credential 842 managed using the credential management table 840, as a client registered to the authorization server 112. For this reason, the request (request for activation) transmitted by the monitoring apparatus 101 in step S1203 may be regarded as a request to register the monitoring apparatus 101 to the authorization server 112.

In step S1206, the task management unit 504 of the monitoring apparatus 101 requests a token from the authorization server 112. This request may be accompanied by the credential obtained in step S1205 and the agent ID obtained in step S901.

In step S1207, the authorization server 112 references the credential management table 840, and confirms the validity of the credential received from the monitoring apparatus 101. If the credential is valid, the authorization server 112 issues a token.

In step S1208, the authorization server 112 transmits the issued token to the monitoring apparatus 101. If the credential is invalid in step S1207, the authorization server 112 may transmit an error to the monitoring apparatus 101.

In step S1209, the task management unit 504 of the monitoring apparatus 101 requests the URL of the resource server 113 and the URL of the device management server 111 from the access-destination management server 115. This request may be accompanied by the token obtained in step S1208. The URL of the access-destination management server 115 may be held in the data management unit 503 in advance. In step S1210, the access-destination management server 115 transmits the URL of the resource server 113 and the URL of the device management server 111 to the monitoring apparatus 101.

In step S1211, the task management unit 504 of the monitoring apparatus 101 performs a communication test for communication with the resource server 113. In step S1212, the task management unit 504 of the monitoring apparatus 101 performs a communication test for communication with the device management server 111. In step S1213, the task management unit 504 of the monitoring apparatus 101 transmits the results of the communication tests to the resource server 113.

Processing for Registering Image Forming Apparatus

Figure 13:
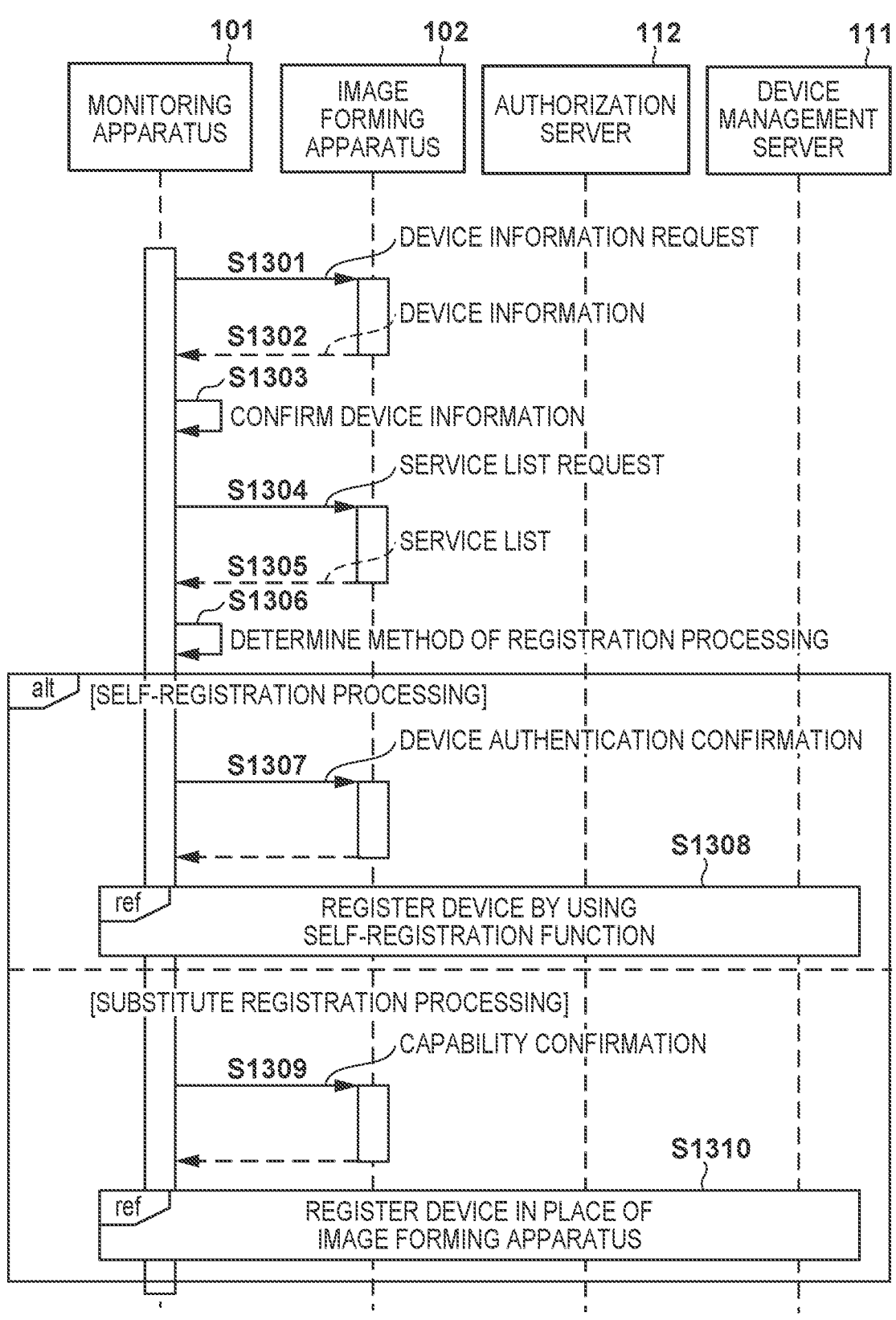
FIG. 13 is a sequence diagram for illustrating an example of processing for registering an image forming apparatus according to the first embodiment.

Processing for registering the image forming apparatus 102 that is executed in step S911 in FIG. 9 will be described in detail with reference to FIG. 13. In step S1301, the device management unit 501 of the monitoring apparatus 101 requests device information from the image forming apparatus 102, by using the IP address 703, the host name, and the like included in the device management table 700. The device information may include the MAC address, the serial number, and the like of the image forming apparatus 102. In step S1302, the image forming apparatus 102 transmits the device information to the monitoring apparatus 101 in response to this request.

In step S1303, the device management unit 501 of the monitoring apparatus 101 determines whether or not the serial number 702 in the device management table 700 and the serial number obtained in step S1302 match. If these serial numbers do not match, the device management unit

501 may end the procedure, assuming that the IP address of the image forming apparatus 102 having been changed. In addition to this or in place of this, if the serial number obtained in step S909 and the serial number obtained in step S1302 do not match, the device management unit 501 may end the procedure. In addition to this or in place of this, if comparison between serial numbers cannot be performed, and the MAC address obtained in step S909 and the MAC address obtained in step S1302 do not match, the device management unit 501 may end the procedure.

In step S1304, the device management unit 501 of the monitoring apparatus 101 requests a list of services provided by the image forming apparatus 102, from the image forming apparatus 102. In step S1305, in response to this request, the image forming apparatus 102 transmits a list of services it provides, to the monitoring apparatus 101.

The monitoring apparatus 101 determines whether or not the image forming apparatus 102 has a self-registration function for registration to the authorization server 112, based on the list of services obtained in step S1305. The self-registration function refers to a function for executing self-registration processing for registration to the authorization server 112. The self-registration function includes a function of transmitting a request to register the image forming apparatus 102 itself to the authorization server 112, to the authorization server 112. If the list of services obtained in step S1305 includes the self-registration function, the monitoring apparatus 101 determines that the image forming apparatus 102 has the self-registration function for registration to the authorization server 112.

In step S1306, the device management unit 501 of the monitoring apparatus 101 performs determination on a method for registration processing for registering the image forming apparatus 102 to the authorization server 112. The device management unit 501 selects one of registration processing that uses the self-registration function and registration processing that does not use the self-registration function. As described above, registration processing that uses the self-registration function is referred to as "self-registration processing". In registration processing that does not use the self-registration function, as will be described later, the monitoring apparatus 101 executes registration processing in place of the image forming apparatus 102. For this reason, such processing is referred to as "substitute registration processing". When self-registration processing is selected, the monitoring apparatus 101 may execute steps S1307 and S1308. When substitute registration processing is selected, the monitoring apparatus 101 may execute steps S1309 and S1310.

First, the device management unit 501 references the monitoring method 706 in the device management table 700, and determines a monitoring method for monitoring the image forming apparatus 102 included in the device list. The device management unit 501 selects substitute registration processing for an image forming apparatus 102 for which a method other than the proxy method (for example, the polling method) is set. The device management unit 501 determines whether or not an image forming apparatus 102 for which the proxy method is set has the self-registration function.

The device management unit 501 selects self-registration processing for an image forming apparatus 102 for which the proxy method is set, and that has the self-registration function. The device management unit 501 cannot select self-registration processing for an image forming apparatus 102 for which the proxy method is set, and that does not have the self-registration function. In view of this, the device management unit 501 changes the monitoring method of such an image forming apparatus 102 to the polling method, and selects substitute registration processing. In this manner, the device management unit 501 may determine a monitoring method of the image forming apparatus 102 based on whether or not the image forming apparatus 102 has a function (for example, self-registration processing) that is requested in order for the monitoring apparatus 101 to monitor the image forming apparatus 102 using the proxy method.

In step S1307, the monitoring apparatus 101 confirms, using the credential, whether or not it is possible to access the authorization processing unit 401 of the image forming apparatus 102. In this confirmation, the monitoring apparatus 101 uses a credential that an external apparatus on the network uses in order to access the authorization processing unit 401 of the image forming apparatus 102 via the LAN 121. The credential may be stored in the monitoring apparatus 101 in advance, or may be set by the user 900 using the screen control unit 505. When it is impossible to access the authorization processing unit 401 of the image forming apparatus 102, the monitoring apparatus 101 may end the procedure.

In step S1308, the monitoring apparatus 101 registers the image forming apparatus 102 to the authorization server 112 using the self-registration function of the image forming apparatus 102. This processing will be described in detail later.

In step S1309, the device management unit 501 of the monitoring apparatus 101 confirms whether or not it is possible to obtain information that is used for performing a monitoring operation (for example, a product name, a product type, the number of print sets, information regarding consumables, an error status, an error log, and the like) from the image forming apparatus 102. If such information cannot be obtained, the monitoring apparatus 101 may end the procedure.

In step S1310, the monitoring apparatus 101 registers the image forming apparatus 102 to the authorization server 112 in place of the image forming apparatus 102. This processing will be described later in detail.

Monitoring Method Settings Screen

An example of a screen 1400 that is displayed by the screen control unit 505 of the monitoring apparatus 101 in order to obtain, from the user 900, settings of a method for monitoring an image forming apparatus 102 will be described with reference to FIG. 14. The screen 1400 includes radio buttons 1401, text boxes 1402 and 1403, a save button 1404, and a cancel button 1405. A monitoring method may be collectively set for all of the image forming apparatuses 102 that are managed by the monitoring apparatus 101. Alternatively, a monitoring method may be individually set for each image forming apparatus 102 that is managed by the monitoring apparatus 101.

The monitoring apparatus 101 obtains setting of a monitoring method of the image forming apparatus 102 from the user 900 using the radio buttons 1401. The monitoring method can be selected from two methods, namely the proxy method and the polling method. Alternatively, the monitoring apparatus 101 may be able to monitor the image forming apparatus 102 using another monitoring method.

The monitoring apparatus 101 uses the text box 1402 to obtain the IP address of the proxy server from the user 900. The monitoring apparatus 101 uses the text box 1403 to obtain the port number of the proxy server from the user 900. The monitoring apparatus 101 may enable input to the text boxes 1402 and 1403 when the proxy method is selected using the corresponding radio button 1401. The monitoring apparatus 101 may disable input to the text boxes 1402 and 1403 when the polling method is selected using the corresponding radio button 1401.

In accordance with the save button 1404 being pressed by the user 900, the monitoring apparatus 101 stores content set on the screen 1400, to the data management unit 503. In accordance with the cancel button 1405 being pressed by the user 900, the monitoring apparatus 101 returns to the previous screen without setting a monitoring method.

In accordance with the save button 1404 being pressed in a state where the proxy method is selected using the radio button 1401, the monitoring apparatus 101 determines the validity of input content in the text boxes 1402 and 1403. If the input content in the text box 1402 is not a valid IP address, or the port number input in the text box 1403 is already in use, the monitoring apparatus 101 may notify the user 900 that the settings cannot be reflected.

When it is determined that the input content in the text boxes 1402 and 1403 is valid, the monitoring apparatus 101 enables the proxy unit 502. Accordingly, the monitoring apparatus 101 operates as a proxy server in accordance with the input content in the text boxes 1402 and 1403 (IP address and port number).

An image forming apparatus 102 that is monitored using the proxy method communicates with a server in the management system 100 via a designated proxy server (for example, the monitoring apparatus 101), and uses a service that is provided by this server. The monitoring apparatus 101 monitors communication data that is transmitted/received between the image forming apparatus 102 and the server. The proxy method can be set for an image forming apparatus 102 that has a function of using a service (for example, self-registration function). The monitoring apparatus 101 monitors the image forming apparatus 102 that has a function of using a service (for example, self-registration function), using a monitoring method other than the proxy method (for example, the polling method).

In the proxy method, it suffices for the configuration (for example, application) of the image forming apparatus 102 to be updated in order for the server in the management system 100 to provide a new service, and there is no need to change the configuration of the monitoring apparatus 101. In addition, the monitoring apparatus 101 does not need to actively obtain information from the image forming apparatus 102 and provide the information to the server, and thus the processing load on the monitoring apparatus 101 reduces. The server in the management system 100 can directly give an instruction to the image forming apparatus 102, and thus can return a real-time remote command in response to a request from the image forming apparatus 102. The server can transmit a remote command that is highly likely to be successful, without managing sleeping and switching off of the image forming apparatus 102, for example.

On the other hand, in the proxy method, when communication between the image forming apparatus 102 and the server is encrypted, an intermediate certificate and the like need to be individually set in order for the monitoring apparatus 101 that functions as a proxy server to recognize the content of the communication. For this reason, although the monitoring apparatus 101 can display, as a communication log, a time of communication between the image forming apparatus 102 and the server, it can be difficult for the monitoring apparatus 101 to display the content of the communication.

An image forming apparatus 102 that is monitored using the polling method does not communicate with a server in the management system 100. Instead, the image forming apparatus 102 transmits information that is used by the server in the management system 100, to the monitoring apparatus 101 in accordance with polling performed from the monitoring apparatus 101. The monitoring apparatus 101 transmits the information obtained from the image forming apparatus 102, to the server in the management system 100. The image forming apparatus 102 that is monitored using the polling method does not perform self-registration processing. For this reason, the monitoring apparatus 101 can monitor the image forming apparatus 102 using the polling method, regardless of whether or not the image forming apparatus 102 has the capability of performing self-registration processing.

In the polling method, the monitoring apparatus 101 can recognize the content of the information obtained from the image forming apparatus 102, and thus the monitoring apparatus 101 can easily perform management and control. The monitoring apparatus 101 can display a communication log to the user 900, and set a time period for collecting information from the image forming apparatus 102, for example. In addition, in the polling method, the monitoring apparatus 101 can also collect information from an old device that does not have a capability of performing self-registration processing, and a device that does not have a capability that supports the server in the management system 100.

On the other hand, in the polling method, the monitoring apparatus 101 needs to be updated in order for the server in the management system 100 to provide a new service. In addition, due to the processing burden from the monitoring apparatus 101 collecting information from the image forming apparatus 102, the number of image forming apparatuses 102 that can be managed can be smaller compared with the proxy method.

Self-registration Processing of Image Forming Apparatus

Processing for registering the image forming apparatus 102 to the authorization server 112 using the self-registration function, the processing being executed in step S1308 in FIG. 13, will be described in detail with reference to FIG. 15. In step S1501, the device management unit 501 of the monitoring apparatus 101 inquires of the authorization processing unit 401 of the image forming apparatus 102 about the registration state of the image forming apparatus 102 to the authorization server 112. In step S1502, in response to this inquiry, the authorization processing unit 401 of the image forming apparatus 102 notifies the monitoring apparatus 101 of the registration state thereof, in other words whether or not the image forming apparatus 102 is registered in the authorization server 112. The authorization processing unit 401 of the image forming apparatus 102 may store the registration state of the image forming apparatus 102 in the authorization server 112, for example, to the RAM 203. If the image forming apparatus 102 is already registered in the authorization server 112, the monitoring apparatus 101 ends the procedure. If the image forming apparatus 102 is not registered in the authorization server 112, the monitoring apparatus 101 executes the processing in step S1503 onward.

In step S1503, the device management unit 501 of the monitoring apparatus 101 requests a device registration key from the device management server 111. This request may be accompanied by the server provided device ID of the image forming apparatus 102 that is a registration target, and the token obtained in step S1208. The device management unit 501 may use the server provided device ID 707 in the device management table 700 as this server provided device ID.

In step S1504, the device management server 111 examines the validity of the token received from the monitoring apparatus 101. After the token is validated successfully, the device management server 111 determines whether or not a record that has the server provided device ID 611 that matches the server provided device ID received from the monitoring apparatus 101 is included in the device management table 610. Such a record being included in the device management table 610 means that the image forming apparatus 102 that is a registration target is managed by the device management server 111. When the image forming apparatus 102 that is a registration target is managed by the device management server 111, the device management server 111 requests a device registration key from the device management server 111. This request may be accompanied by the server provided device ID obtained in step S1503.

In step S1505, the authorization server 112 determines whether or not a record that has the client ID 831 that matches the server provided device ID received in step S1504 is included in the client management table 830. Such a record being included in the client management table 830 means that the image forming apparatus 102 that is a registration target is managed by the authorization server 112. When the image forming apparatus 102 that is a registration target is managed by the authorization server 112, the authorization server 112 issues a device registration key. The authorization server 112 adds a new record to the registration key management table 820. The authorization server 112 sets the issued device registration key as the device registration key 821 of the new record. The authorization server 112 sets the tenant ID 833 in the client management table 830 as the tenant ID 822 of the new record. The authorization server 112 sets the expiration date 823 of the new record in accordance with a rule set in advance.

In step S1506, the authorization server 112 transmits the device registration key issued in step S1505 to the device management server 111. In step S1507, the device management server 111 transmits the device management key received in step S1506 to the monitoring apparatus 101.

In step S1508, the device management unit 501 of the monitoring apparatus 101 instructs the image forming apparatus 102 to use a designated proxy server. This instruction may be accompanied by information regarding the proxy server. The information regarding the proxy server may include an IP address and a port number. The information regarding the proxy server may be the IP address and the port number obtained from the user 900 via the screen 1400 in FIG. 14. The monitoring apparatus 101 may operate as a proxy server that has these IP address and port number. Alternatively, the monitoring apparatus 101 may transmit information regarding a proxy server that is different from the monitoring apparatus 101, to the image forming apparatus 102. In this case, the monitoring apparatus 101 may obtain communication data of the image forming apparatus 102 from this proxy server.

In step S1509, the data management unit 402 of the image forming apparatus 102 sets the information regarding the proxy server received in step S1508. The image forming apparatus 102 then starts to use the set proxy server. For this reason, communication between the image forming apparatus 102 and the wide area network 120 is performed via the set proxy server. In step S1510, the data management unit 402 of the image forming apparatus 102 notifies the monitoring apparatus 101 that setting of the proxy server has been completed.

In step S1511, the device management unit 501 of the monitoring apparatus 101 inquires of the authorization processing unit 401 of the image forming apparatus 102 about the information regarding the proxy server set in the image forming apparatus 102. In step S1512, the authorization processing unit 401 of the image forming apparatus 102 transmits the set information regarding the proxy server to the monitoring apparatus 101. The data management unit 503 of the monitoring apparatus 101 stores the received information regarding the proxy server.

In step S1513, the device management unit 501 of the monitoring apparatus 101 instructs the image forming apparatus 102 to transmit, to the authorization server 112, a request to register the image forming apparatus 102 to the authorization server 112. This instruction may be accompanied by the device registration key obtained in step S1507. In step S1514, the image forming apparatus 102 transmits a confirmation response to the monitoring apparatus 101.

In step S1515, the authorization processing unit 401 of the image forming apparatus 102 requests an activation code from the authorization server 112. This request may be accompanied by the device registration key obtained in step S1513 and the serial number of the image forming apparatus 102. The serial number of the image forming apparatus 102 is stored in the ROM 202, for example.

In step S1516, the authorization server 112 references the registration key management table 820, and specifies a record that has the device registration key 821 that matches the device registration key obtained in step S1515. The authorization server 112 confirms the validity of the device registration key based on the expiration date 823 of this record. If the device registration key is valid, the authorization server 112 issues an activation code. The authorization server 112 adds a new record to the device activation code management table 810. The authorization server 112 sets the issued activation code as the activation code 811 of the new record. The authorization server 112 sets the serial number obtained in step S1515 as the serial number 812 of the new record. The authorization server 112 sets the device registration key obtained in step S1515 as the device registration key 813 of the new record. The authorization server 112 sets the expiration date 814 of the new record in accordance with a rule set in advance.

In step S1517, the authorization server 112 transmits the activation code to the image forming apparatus 102. When such a record cannot be specified or the device registration key is invalid, the authorization server 112 may transmit an error to the image forming apparatus 102.

In step S1518, receiving the activation code, the authorization processing unit 401 of the image forming apparatus 102 requests the authorization server 112 to activate the image forming apparatus 102. This request may be accompanied by the activation code obtained in step S1517, the device registration key obtained in step S1513, and the serial number of the image forming apparatus 102. The serial number of the image forming apparatus 102 is stored in the ROM 202, for example.

In step S1519, the authorization server 112 references the device activation code management table 810, and specifies a record that has the activation code 811, the serial number 812, and the device registration key 813 that respectively match the activation code, the serial number, and the device registration key obtained in step S1518. If such a record can be specified, the authorization server 112 confirms the validity of the activation code 811 based on the expiration date 814 of this record. If the activation code 811 is valid, the authorization server 112 issues a credential. The authorization server 112 also adds a new record to the credential management table 840. The authorization server 112 sets the serial number obtained in step S1518 as the client ID 841, and sets the issued credential as the credential 842.

In step S1520, the authorization server 112 transmits the issued credential to the image forming apparatus 102. If a record cannot be specified in step S1519 or the activation code 811 is invalid, the authorization server 112 may transmit an error to the image forming apparatus 102.

The authorization server 112 may regard a client that has the credential 842 that is managed using the credential management table 840, as a client registered in the authorization server 112 itself. For this reason, the request transmitted by the image forming apparatus 102 in step S1518 (request for activation) may be regarded as a request to register the image forming apparatus 102 to the authorization server 112.

In step S1521, receiving the confirmation response in step S1514, the monitoring apparatus 101 may confirm the registration state of the image forming apparatus 102. This processing will be described later in detail. In an embodiment in which the confirmation response in step S1514 is omitted, the monitoring apparatus 101 may execute the processing of step S1521 in accordance with transmission of the instruction in step S1513.

Processing for Confirming Registration State

Processing for confirming a registration state that is executed in step S1521 in FIG. 15 will be described in detail with reference to FIG. 16. In step S1601, the device management unit 501 of the monitoring apparatus 101 initializes a counter to 0. This counter counts the number of times processing for confirming a registration state has been attempted.

In step S1602, the device management unit 501 of the monitoring apparatus 101 obtains the registration state of the image forming apparatus 102 to the authorization server 112. The device management unit 501 inquires of the authorization processing unit 401 of the image forming apparatus 102 about the registration state, for example. The device management unit 501 obtains the registration state of the image forming apparatus 102 to the authorization server 112 as a response to this inquiry.

In step S1603, the device management unit 501 of the monitoring apparatus 101 determines whether or not the registration state of the image forming apparatus 102 is "registered". The device management unit 501 advances the procedure to step S1607 if it is determined that the image forming apparatus 102 is registered ("YES" in step S1603), otherwise, that is to say, if it is determined that the image forming apparatus 102 is not registered ("NO" in step S1603), the device management unit 501 advances the procedure to step S1604. In step S1607, the device management unit 501 of the monitoring apparatus 101 sets the registration state 705 of the target record in the device management table 700, to "registered". If the registration state 705 is already "registered", the device management unit 501 maintains the registration state 705 as "registered".

In step S1604, the device management unit 501 of the monitoring apparatus 101 increments the counter by 1. In step S1605, the device management unit 501 determines whether or not the counter has reached a predetermined number of times. If it is determined that the counter has reached the predetermined number of times ("YES" in step S1605), the device management unit 501 advances the procedure to step S1606, otherwise ("NO" in step S1605) the device management unit 501 advances the procedure to step S1602. The predetermined number of times of the counter may be set in advance and stored in the monitoring apparatus 101. In this manner, the device management unit 501 repeatedly obtains the registration state managed by the image forming apparatus 102, from the image forming apparatus 102.

In step S1606, the device management unit 501 of the monitoring apparatus 101 sets the registration state 705 of the target record in the device management table 700 to "not registered"

Substitute Registration Processing for Image Forming Apparatus

Figure 17:
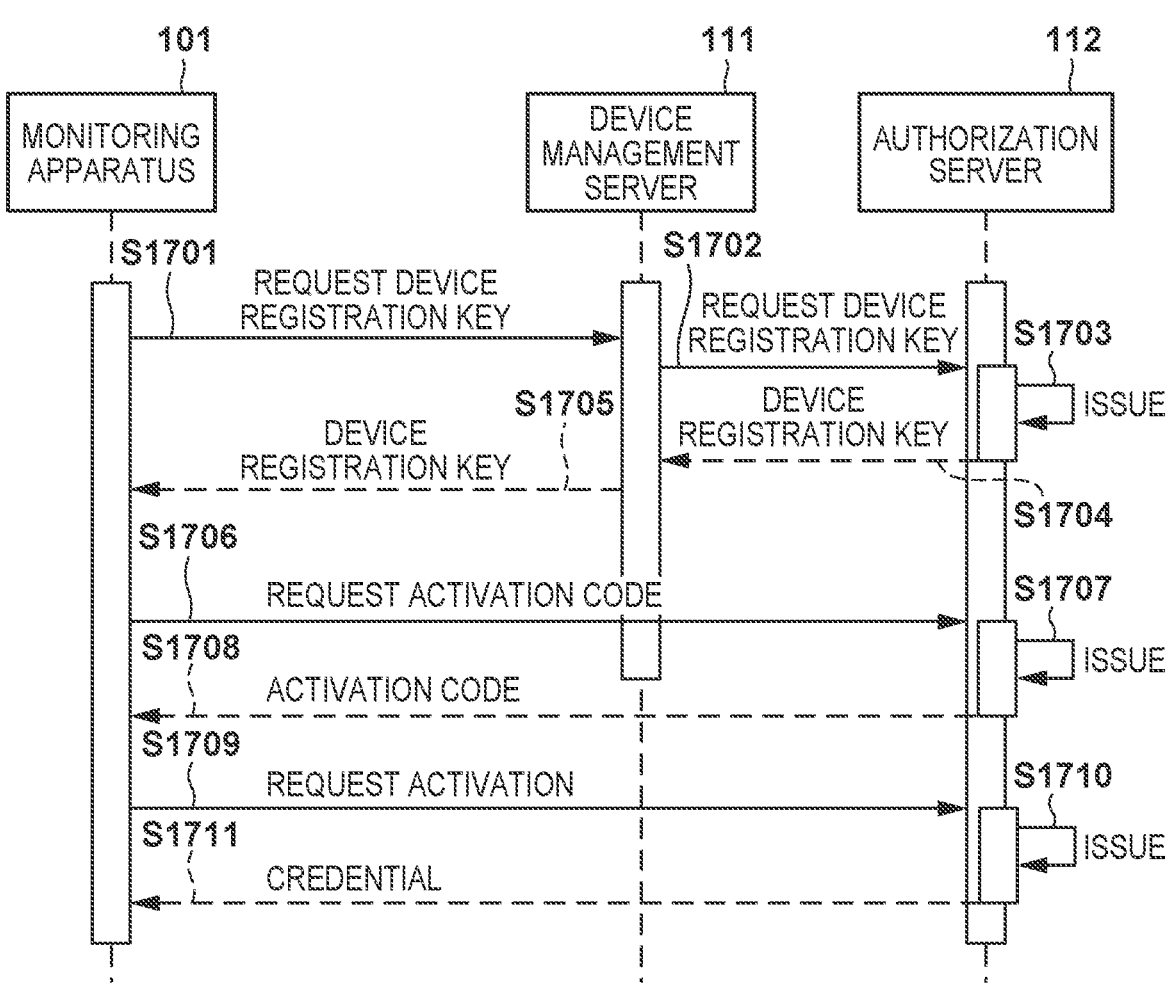
FIG. 17 is a sequence diagram for illustrating an example of substitute registration processing for an image forming apparatus according to the first embodiment.

Processing in which the image forming apparatus 102 is registered to the authorization server 112 by the monitoring apparatus 101 in place of the image forming apparatus 102, the processing being performed in step S1310 in FIG. 13, will be described in detail with reference to FIG. 17. In step S1701, the device management unit 501 of the monitoring apparatus 101 requests a device registration key from the device management server 111. This request may be accompanied by the server provided device ID of the image forming apparatus 102 that is a registration target, and the token obtained in step S1208. The device management unit 501 may use the server provided device ID 707 in the device management table 700, as this server provided device ID.

In step S1702, the device management server 111 examines the validity of the token received from the monitoring apparatus 101. After the token is validated successfully, the device management server 111 determines whether or not a record that has the server provided device ID 611 that matches the server provided device ID received from the monitoring apparatus 101 is included in the device management table 610. Such a record being included in the device management table 610 means that the image forming apparatus 102 that is a registration target is managed by the device management server 111. When the image forming apparatus 102 that is a registration target is managed by the device management server 111, the device management server 111 requests a device registration key from the authorization server 112. This request may be accompanied by the server provided device ID obtained in step S1701.

In step S1703, the authorization server 112 determines whether or not a record that has the client ID 831 that matches the server provided device ID received in step S1702 is included in the client management table 830. Such a record being included in the client management table 830 means that the image forming apparatus 102 that is a registration target is managed by the authorization server 112. When the image forming apparatus 102 that is a registration target is managed by the authorization server 112, the authorization server 112 issues a device registration key. The authorization server 112 adds a new record to the registration key management table 820. The authorization server 112 sets the issued device registration key as the device registration key 821 of the new record. The authorization server 112 sets the tenant ID 833 in the client management table 830 as the tenant ID 822 of the new record. The authorization server 112 sets the expiration date 823 of the new record in accordance with a rule set in advance.

In step S1704, the authorization server 112 transmits the device registration key issued in step S1703 to the device management server 111. In step S1705, the device management server 111 transmits the device management key received in step S1704 to the monitoring apparatus 101.

In step S1706, the device management unit 501 of the monitoring apparatus 101 requests an activation code from the authorization server 112. This request may be accompanied by the device registration key obtained in step S1705 and the serial number of the image forming apparatus 102. The serial number of the image forming apparatus 102 is stored in the serial number 702 in the device management table 700, for example.

In step S1707, the authorization server 112 references the registration key management table 820, and specifies a record that has the device registration key 821 that matches the device registration key obtained in step S1706. The authorization server 112 confirms the validity of the device registration key based on the expiration date 823 of this record. If the device registration key is valid, the authorization server 112 issues an activation code. The authorization server 112 adds a new record to the device activation code management table 810. The authorization server 112 sets the issued activation code as the activation code 811 of the new record. The authorization server 112 sets the serial number obtained in step S1706, as the serial number 812 of the new record. The authorization server 112 sets the device registration key obtained in step S1706 as the device registration key 813 of the new record. The authorization server 112 sets the expiration date 814 of the new record in accordance with a rule set in advance.

In step S1708, the authorization server 112 transmits the activation code to the monitoring apparatus 101. If such a record cannot be specified, or the device registration key is invalid, the authorization server 112 may transmit an error to the monitoring apparatus 101.

In step S1709, receiving the activation code, the device management unit 501 of the monitoring apparatus 101 requests the authorization server 112 to activate the image forming apparatus 102. This request may be accompanied by the activation code obtained in step S1708, the device registration key obtained in step S1705, and the serial number of the image forming apparatus 102. The serial number of the image forming apparatus 102 is stored in the serial number 702 of the device management table 700, for example.

In step S1710, the authorization server 112 references the device activation code management table 810, and specifies a record that has the activation code 811, the serial number 812, and the device registration key 813 that respectively match the activation code, the serial number, and the device registration key obtained in step S1709. When such a record can be specified, the authorization server 112 confirms the validity of the activation code 811 based on the expiration date 814 of this record. If the activation code 811 is valid, the authorization server 112 issues a credential. The authorization server 112 also adds a new record to the credential management table 840. The authorization server 112 sets the serial number obtained in step S1709 as the client ID 841, and sets the issued credential as the credential 842.

In step S1711, the authorization server 112 transmits the issued credential to the monitoring apparatus 101. If a record cannot be specified in step S1710 or the activation code 811 is invalid, the authorization server 112 may transmit an error to the monitoring apparatus 101.

The authorization server 112 may regard a client that has the credential 842 that is managed using the credential management table 840, as a client registered in the authorization server 112 itself. For this reason, the request (request for activation) that is transmitted by the monitoring apparatus 101 in step S1709 may be regarded as a request to register the image forming apparatus 102 to the authorization server 112.

According to the first embodiment, a device (for example, an image forming apparatus 102) that has the self-registration function sets a proxy server, and then executes self-registration processing, and thus the monitoring apparatus 101 can monitor communication between the device with an external server. In addition, the monitoring apparatus 101 performs registration processing for registering a device (for example, an image forming apparatus 102) that does not have the self-registration function, in place of the device, and obtains information by performing polling. For this reason, the device that does not have the self-registration function does not freely communicate with an external server. As described above, the monitoring apparatus 101 performs device registration processing in an integrated manner.

Second Embodiment

A management system 100 according to a second embodiment will be described with reference to FIG. 18. The second embodiment is different from the first embodiment in processing for registering the image forming apparatus 102 to the authorization server 112 using the self-registration function, the processing being executed in step S1308 in FIG. 13. Items for which description is omitted in the second embodiment may be similar to those in the first embodiment.

In the first embodiment, when the registration state of the image forming apparatus 102 obtained in step S1502 is "registered", the monitoring apparatus 101 ends the procedure as described in detail with reference to FIG. 15. However, there may be a case where, even when the image forming apparatus 102 is "registered", the image forming apparatus 102 has been registered to the authorization server 112 through the self-registration function before the monitoring apparatus 101 executes registration processing. There may also be a case where the image forming apparatus 102 has been registered to the authorization server 112 by a monitoring apparatus that is different from the monitoring apparatus 101. In such cases, the monitoring apparatus 101 cannot monitor the registered image forming apparatus 102. In view of this, in the second embodiment, the monitoring apparatus 101 cancels such registration of the image forming apparatus 102, and then register the image forming apparatus 102 to the authorization server 112 again.

Self-registration Processing of Image Forming Apparatus

Processing for registering the image forming apparatus 102 to the authorization server 112 using the self-registration function, the processing being executed in step S1308 in FIG. 13 in the second embodiment, will be described in detail with reference to FIG. 18. First, the monitoring apparatus 101 executes the same processing as the processing of steps S1501 and S1502 in FIG. 15. If the registration state of the image forming apparatus 102 obtained in step S1502 is "registered", the monitoring apparatus 101 executes steps S1801 to S1805. The monitoring apparatus 101 then executes the same processing as the processing of step S1503 in FIG. 15 onward.

In step S1801, the device management unit 501 of the monitoring apparatus 101 instructs the image forming apparatus 102 to use a designated proxy server. This instruction may be accompanied by information regarding the proxy server. The information regarding the proxy server may include an IP address and a port number. The information regarding the proxy server may be the IP address and the port number obtained from the user 900 via the screen 1400 in FIG. 14. The monitoring apparatus 101 may operate as a proxy server that has the IP address and the port number. Alternatively, the monitoring apparatus 101 may transmit information regarding a proxy server that is different from the monitoring apparatus 101, to the image forming apparatus 102. In this case, the monitoring apparatus 101 may obtain communication data of the image forming apparatus 102 from this proxy server.

In step S1802, the data management unit 402 of the image forming apparatus 102 sets the information regarding the proxy server received in step S1801. The image forming apparatus 102 then starts to use the set proxy server. For this reason, communication between the image forming apparatus 102 and the wide area network 120 is performed via the set proxy server. In step S1803, the data management unit 402 of the image forming apparatus 102 notifies the monitoring apparatus 101 that setting of the proxy server has been completed.

In step S1804, the device management unit 501 of the monitoring apparatus 101 instructs the image forming apparatus 102 to transmit, to the authorization server 112, a request to cancel registration of the image forming apparatus 102. The authorization processing unit 401 of the image forming apparatus 102 transmits, to the authorization server 112, a request to cancel registration of the image forming apparatus 102 in accordance with this instruction. The authorization server 112 deletes information regarding the image forming apparatus 102 from the tables in accordance with this request. Accordingly, registration of the image forming apparatus 102 performed by the authorization server 112 is cancelled. In step S1805, the authorization processing unit 401 of the image forming apparatus 102 notifies the monitoring apparatus 101 that registration has been cancelled successfully.

Even when the image forming apparatus 102 is registered, the monitoring apparatus 101 may execute processing for registering the image forming apparatus 102 instead of instructing the image forming apparatus 102 to cancel registration. When a new registration request for the registered image forming apparatus 102 is received, the authorization server 112 may update the content of registration of the image forming apparatus 102, in accordance with the new registration request.

According to the second embodiment, even image forming apparatuses 102 already registered in the authorization server 112 can be monitored by the monitoring apparatus 101 in a collective manner.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™M), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-185755, filed Nov. 21, 2022, which is hereby incorporated by reference herein in its entirety.

What is claimed is:

1. A monitoring apparatus for monitoring a device, the monitoring apparatus comprising:
a memory storing instructions; and
a processor configured to execute the instructions to:
obtain a device list from a device management server;
determine a monitoring method for monitoring a device included in the device list and connected to a same local network as the monitoring apparatus;
transmit an inquiry to a first device, which is included in the device list and monitored using a first monitoring method, about a registration state of the first device with an authorization server that is accessible through the Internet;
execute a registration instruction processing a for the first device in a case where the registration state of the first device indicates that the first device is not registered with the authorization server
wherein the registration instruction processing includes:
instructing the first device to use a designated proxy server; and
instructing the first device to transmit, to the authorization server, a request to register the first device with the authorization server, after the first device has started to use the designated proxy server; and
execute a substitute registration processing to register, with the authorization server, a second device included in the device list and monitored using a second monitoring method different from the first monitoring method, wherein the substitute registration processing does not include instructing the second device to use the predetermined proxy server.

2. The monitoring apparatus according to claim 1, wherein the substitute registration processing includes transmitting, to the authorization server, a request to register the second device with the authorization server.

3. The monitoring apparatus according to claim 1, wherein:
the processor is further configured to execute the instructions to cause the monitoring apparatus to further operate as a proxy server, and
the registration instruction processing includes instructing the first device to use the proxy server operated on the monitoring apparatus as the designated proxy server.

4. The monitoring apparatus according to claim 1, wherein the processor determines the monitoring method for the device based on whether the device has a function that is requested for the monitoring apparatus to monitor the device using the first monitoring method.

5. The monitoring apparatus according to claim 4, wherein the requested function includes a function of transmitting, to the authorization server, a request to register the device with the authorization server.

6. The monitoring apparatus according to claim 1, wherein the processor is further configured to execute the instructions to:
execute a registration processing that includes transmitting, to the authorization server, a request to register the monitoring apparatus with the authorization server; and
obtain the device list from the device management server after the registration processing is executed.

7. The monitoring apparatus according to claim 1, wherein the processor is further configured to execute the instructions to cause the monitoring apparatus to, in a case where the registration state of the first device indicates that the first device is already registered with the authorization server, instruct the first device to transmit, to the authorization server, a request to cancel registration of the first device before executing the registration instruction processing.

8. The monitoring apparatus according to claim 1, wherein:
the first monitoring method monitors communication data transmitted or received by the first device via the designated proxy server, and
the second monitoring method monitors information obtained from the second device by performing polling.

9. A method of controlling a monitoring apparatus that monitors a device, the method comprising:
obtaining a device list from a device management server;
determining a monitoring method for monitoring a device included in the device list and connected to a same local network as the monitoring apparatus;
transmitting an inquiry to a first device, which is included in the device list and monitored using a first monitoring method, about a registration state of the first device with an authorization server that is accessible through the Internet;
executing a registration instruction processing for the first device in a case where the registration state of the first device indicates that the first device is not registered with the authorization server,
wherein the registration instruction processing includes:
instructing the first device to use a designated proxy server; and
instructing the first device to transmit, to the authorization server, a request to register the first device with the authorization server, after the first device has started to use the designated proxy server; and
executing a substitute registration processing to register, with the authorization server, a second device included in the device list and monitored using a second monitoring method different from the first monitoring method, wherein the substitute registration processing does not include instructing the second device to use the predetermined proxy server.

10. A non-transitory computer readable storage medium storing a program executable by a computer to execute a method of controlling a monitoring apparatus, the method comprising:

obtaining a device list from a device management server;

determining a monitoring method for monitoring a device included in the device list and connected to a same local network as the monitoring apparatus;

transmitting an inquiry to a first device, which is included in the device list and monitored using a first monitoring method, about a registration state of the first device with an authorization server that is accessible through the Internet;

executing a registration instruction processing for the first device in a case where the registration state of the first device indicates that the first device is not registered with the authorization server wherein the registration instruction processing includes:

instructing the first device to use a designated proxy server; and instructing the first device to transmit, to the authorization server, a request to register the first device with the authorization server, after the first device has started to use the designated proxy server; and executing a substitute registration processing to register, with the authorization server, a second device included in the device list and monitored using a second monitoring method different from the first monitoring method, wherein the substitute registration processing does not include instructing the second device to use the predetermined proxy server.

* * * * *